United States Patent
Aoyama

(10) Patent No.: US 12,492,899 B2
(45) Date of Patent: Dec. 9, 2025

(54) PHYSICAL QUANTITY DETECTION CIRCUIT AND PHYSICAL QUANTITY DETECTION DEVICE

(71) Applicant: SEIKO EPSON CORPORATION, Tokyo (JP)

(72) Inventor: Takashi Aoyama, Chino (JP)

(73) Assignee: SEIKO EPSON CORPORATION (JP)

( * ) Notice: Subject to any disclaimer, the term of this patent is extended or adjusted under 35 U.S.C. 154(b) by 293 days.

(21) Appl. No.: 18/187,982

(22) Filed: Mar. 22, 2023

(65) Prior Publication Data

US 2023/0304796 A1  Sep. 28, 2023

(30) Foreign Application Priority Data

Mar. 23, 2022  (JP) .................................. 2022-046491

(51) Int. Cl.
*G01C 19/5614* (2012.01)
(52) U.S. Cl.
CPC .................................. *G01C 19/5614* (2013.01)
(58) Field of Classification Search
None
See application file for complete search history.

(56) References Cited

U.S. PATENT DOCUMENTS

| | | | | |
|---|---|---|---|---|
| 10,746,809 B2 * | 8/2020 | Takada | .................... | G06G 7/186 |
| 2005/0072233 A1 * | 4/2005 | Nozoe | .................... | G01P 15/18 |
| | | | | 73/514.16 |
| 2006/0222291 A1 * | 10/2006 | Yoshida | .................. | G02B 6/358 |
| | | | | 385/18 |
| 2007/0261488 A1 * | 11/2007 | Murashima | ........ | G01C 19/5607 |
| | | | | 73/504.04 |
| 2012/0111111 A1 * | 5/2012 | Murakami | ......... | G01C 19/5614 |
| | | | | 73/504.12 |
| 2015/0122022 A1 * | 5/2015 | Maki | .................. | G01C 19/5614 |
| | | | | 73/504.16 |
| 2019/0094284 A1 * | 3/2019 | Takada | ...................... | H03F 3/45 |

(Continued)

FOREIGN PATENT DOCUMENTS

JP  2020180785 A  11/2020

*Primary Examiner* — Mark A Shabman
(74) *Attorney, Agent, or Firm* — Harness, Dickey & Pierce, P.L.C.

(57) ABSTRACT

A physical quantity detection circuit includes: a drive circuit configured to apply a drive signal, which includes a first frequency component and a second frequency component having a frequency different from a frequency of the first frequency component, to a drive electrode of a physical quantity detection element; a physical quantity detection signal output circuit configured to output a physical quantity detection signal, based on a first physical quantity component output from a first detection electrode of the physical quantity detection element and a second physical quantity component output from a second detection electrode of the physical quantity detection element; and a first failure diagnosis signal output circuit configured to output a first failure diagnosis signal generated based on a first electrostatic leakage component resulting from the second frequency component propagating to the first detection electrode and a second electrostatic leakage component resulting from the second frequency component propagating to the second detection electrode.

9 Claims, 12 Drawing Sheets

(56) References Cited

U.S. PATENT DOCUMENTS

| | | | | |
|---|---|---|---|---|
| 2019/0126936 A1* | 5/2019 | Murashima | ........ | G01C 19/5614 |
| 2019/0293424 A1* | 9/2019 | Haneda | ............... | H03F 3/45475 |
| 2020/0340812 A1* | 10/2020 | Aoyama | ............ | G01C 19/5614 |

* cited by examiner

PHYSICAL QUANTITY DETECTION CIRCUIT AND PHYSICAL QUANTITY DETECTION DEVICE

The present application is based on, and claims priority from JP Application Serial Number 2022-046491, filed Mar. 23, 2022, the disclosure of which is hereby incorporated by reference herein in its entirety.

BACKGROUND

1. Technical Field

The present disclosure relates to a physical quantity detection circuit and a physical quantity detection device.

2. Related Art

Nowadays, in various systems and electronic apparatuses, physical quantity detection devices capable of detecting various types of physical quantities are widely used, such as a gyro sensor for detecting an angular velocity and an acceleration sensor for detecting an acceleration. In recent years, in order to achieve high reliability in a system using a physical quantity detection device, a method of checking whether a failure occurs in the physical quantity detection device has been proposed.

For example, JP-A-2020-180785 discloses a physical quantity sensor that diagnoses a failure in parallel with detection of a physical quantity. In the physical quantity sensor disclosed in JP-A-2020-180785, a physical quantity detection circuit applies a drive signal to a drive electrode of a physical quantity detection element to cause two drive vibration arms to perform flexural vibration. In this state, when a physical quantity is applied, two detection vibration arms perform flexural vibration, and accordingly a first physical quantity component and a second physical quantity component are generated in two detection electrodes. The physical quantity detection circuit converts the first physical quantity component and the second physical quantity component into a voltage by two charge amplifier circuits, performs differential amplification on the voltage, and then performs synchronous detection on the voltage to generate a physical quantity detection signal. Further, in the physical quantity detection circuit, a first vibration leakage component and a second vibration leakage component generated in the two detection electrodes due to the flexural vibration of the two drive vibration arms are converted into a voltage by the two charge amplifier circuits, the voltage is subjected to differential amplification and synchronous detection to generate a vibration leakage signal, and failure diagnosis is performed based on the vibration leakage signal. Therefore, according to the physical quantity sensor disclosed in JP-A-2020-180785, when a wiring coupling the physical quantity detection element to the physical quantity detection circuit is disconnected or short-circuited, a magnitude of the vibration leakage signal falls outside a predetermined range, and thus it is possible to make a diagnosis that a failure occurs.

However, in the physical quantity sensor disclosed in JP-A-2020-180785, if the vibration leakage component is zero or close to zero, since there is almost no difference in the magnitude of the vibration leakage signal before and after the disconnection of the wiring coupling the physical quantity detection element to the physical quantity detection circuit, there is a possibility of making an error in the failure diagnosis. Therefore, it is necessary to intentionally perform tuning such that the balance of flexural vibration for the physical quantity detection signal is lost to generate the first vibration leakage component and the second vibration leakage component that are large to some extent. But due to characteristics of the two charge amplifier circuits described above, a part of the vibration leakage component is superimposed on the physical quantity detection signal, and the detection accuracy of the physical quantity may be degraded.

SUMMARY

A physical quantity detection circuit according to an aspect of the present disclosure includes: a drive circuit configured to apply a drive signal including a first frequency component for driving a physical quantity detection element to a drive electrode of the physical quantity detection element, the physical quantity detection element being configured to detect a physical quantity; a physical quantity detection signal output circuit configured to output a physical quantity detection signal corresponding to the physical quantity, based on a first physical quantity component included in a first signal output from a first detection electrode of the physical quantity detection element when the drive signal is applied to the physical quantity detection element and a second physical quantity component included in a second signal output from a second detection electrode of the physical quantity detection element when the drive signal is applied to the physical quantity detection element; and a first failure diagnosis signal output circuit. The drive signal includes a second frequency component having a frequency different from a frequency of the first frequency component. The first signal includes a first electrostatic leakage component that is a component resulting from the second frequency component propagating to the first detection electrode via a first electrostatic coupling capacitor between the drive electrode and the first detection electrode. The second signal includes a second electrostatic leakage component that is a component resulting from the second frequency component propagating to the second detection electrode via a second electrostatic coupling capacitor between the drive electrode and the second detection electrode. The first failure diagnosis signal output circuit outputs a first failure diagnosis signal generated based on the first electrostatic leakage component and the second electrostatic leakage component.

A physical quantity detection device according to an aspect of the present disclosure includes: the physical quantity detection circuit according to the aspect; and the physical quantity detection element.

DESCRIPTION OF EXEMPLARY EMBODIMENTS

Hereinafter, preferred embodiments of the present disclosure will be described in detail with reference to the drawings. The embodiments described below do not unduly limit the scope of the claims. Not all configurations to be described below are necessarily essential components of the present disclosure.

Hereinafter, a physical quantity detection device that detects an angular velocity as a physical quantity, that is, an angular velocity detection device will be described as an example.

1. First Embodiment

1-1. Configuration of Physical Quantity Detection Device

Figure 1:
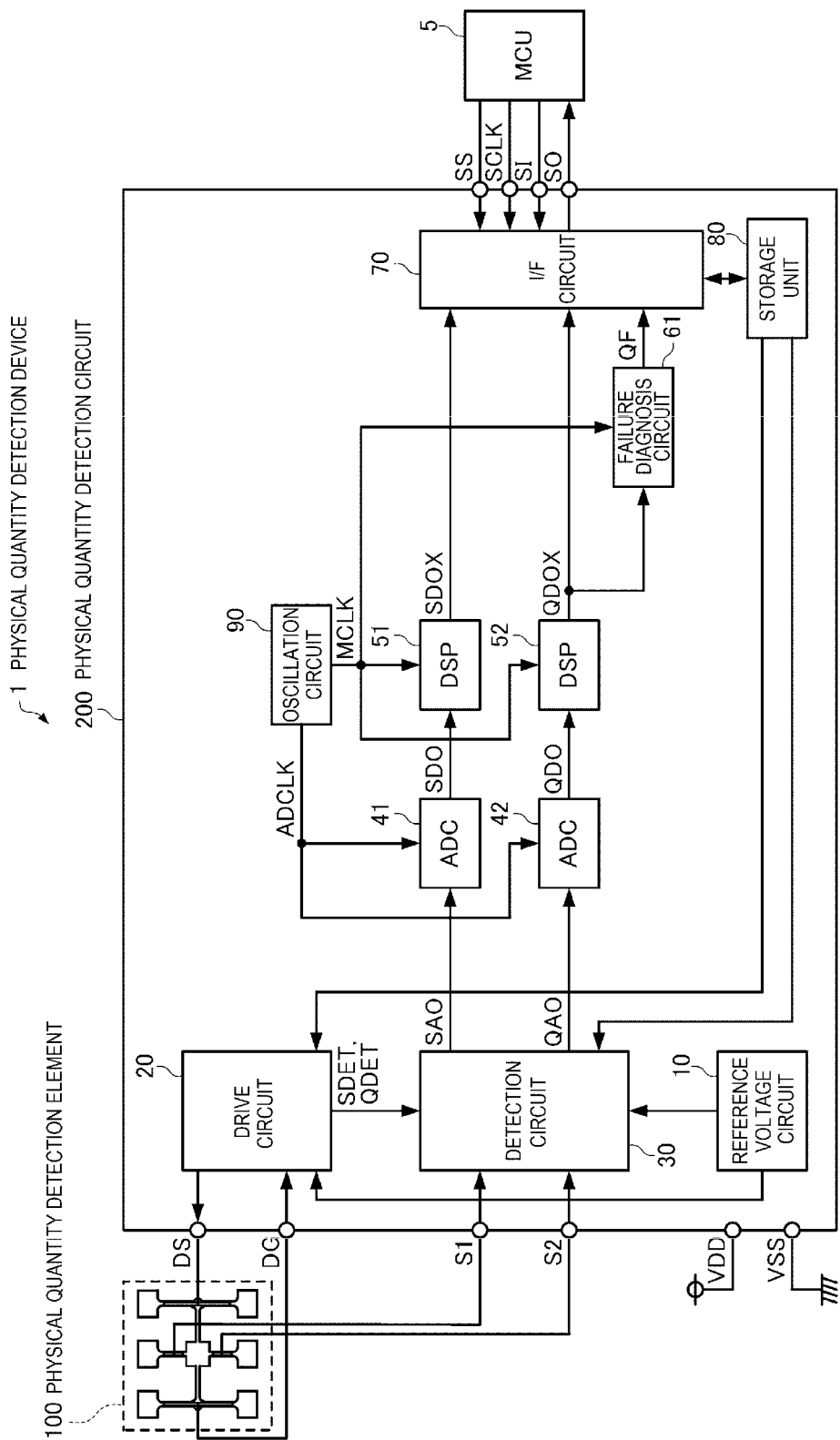
FIG. 1 is a functional block diagram of a physical quantity detection device according to a first embodiment.

FIG. 1 is a functional block diagram of a physical quantity detection device according to a first embodiment. As illustrated in FIG. 1, the physical quantity detection device 1 according to the first embodiment includes a physical quantity detection element 100 that detects a physical quantity, and a physical quantity detection circuit 200.

The physical quantity detection element 100 has a vibrator element in which a drive electrode and a detection electrode are disposed. In general, in order to reduce impedance of the vibrator element as much as possible to increase oscillation efficiency, the vibrator element is sealed in a package, whose airtightness is secured. In the embodiment, the physical quantity detection element 100 has a so-called double T-type vibrator element having two T-type drive vibration arms.

Figure 2:
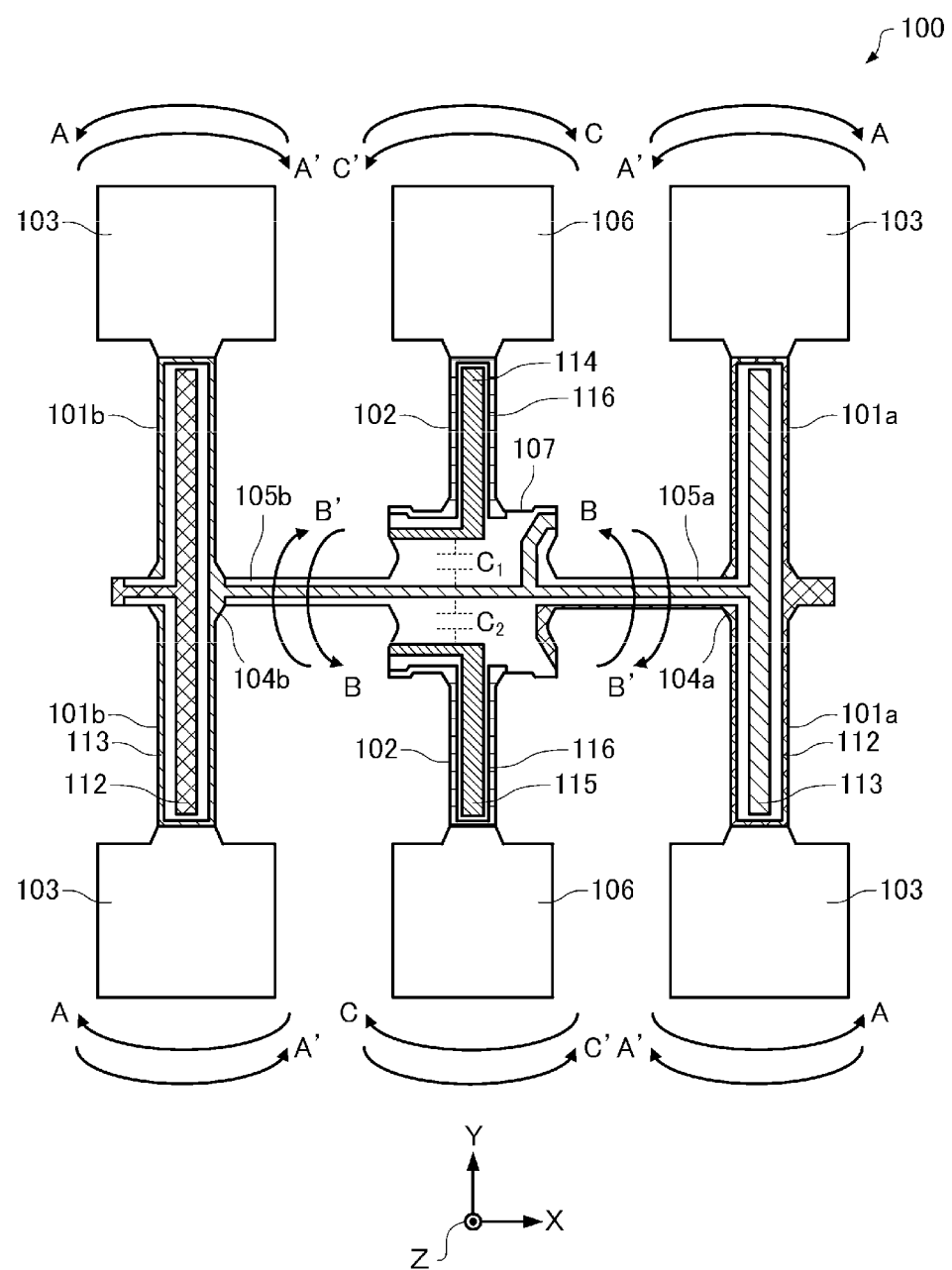
FIG. 2 is a plan view of a vibrator element of a physical quantity detection element.

FIG. 2 is a plan view of the vibrator element of the physical quantity detection element 100 according to the embodiment. The physical quantity detection element 100 includes, for example, a double T-type vibrator element formed of a Z-cut quartz crystal substrate. The vibrator element made of quartz crystal has an advantage that detection accuracy of an angular velocity can be improved since variation in a resonance frequency with respect to a temperature change is extremely small. In FIG. 2, an X axis, a Y axis, and a Z axis indicate axes of the quartz crystal.

As illustrated in FIG. 2, in the vibrator element of the physical quantity detection element 100, drive vibration arms 101a and 101b extend in a +Y axis direction and a −Y axis direction from two drive bases 104a and 104b, respectively. Drive electrodes 112 and 113 are formed at a side surface and an upper surface of the drive vibration arm 101a, respectively, and the drive electrodes 113 and 112 are formed at a side surface and an upper surface of the drive vibration arm 101b, respectively. The drive electrode 112 is coupled to a DG terminal of the physical quantity detection circuit 200 shown in FIG. 1 by a wiring (not illustrated), and the drive electrode 113 is coupled to a DS terminal of the physical quantity detection circuit 200 shown in FIG. 1 by a wiring (not illustrated).

The drive bases 104a and 104b are coupled to a rectangular detection base 107 via coupling arms 105a and 105b that extend in a −X-axis direction and a +X axis direction, respectively.

Detection vibration arms 102 extend from the detection base 107 in the +Y axis direction and the −Y axis direction. Detection electrodes 114 and 115 are formed at upper surfaces of the detection vibration arms 102, and common electrodes 116 are formed at side surfaces of the detection vibration arms 102. The detection electrodes 114 and 115 are coupled to a detection circuit 30 via an S1 terminal and an S2 terminal of the physical quantity detection circuit 200 illustrated in FIG. 1, respectively. The common electrode 116 is grounded.

When an AC voltage is applied as a drive signal between the drive electrode 112 and the drive electrode 113 of the drive vibration arms 101a and 101b, tip ends of the two drive vibration arms 101a and 101b perform a flexural vibration of repeatedly approach and separate from each other in an A direction and an A' direction due to an inverse piezoelectric effect. Hereinafter, the flexural vibration of the drive vibration arms 101a and 101b may be referred to as "excitation vibration".

In this state, when an angular velocity with the Z axis as a rotation axis is applied to the vibration element of the physical quantity detection element 100, the drive vibration arms 101a and 101b obtain a Coriolis force in a direction perpendicular to both a direction of the flexural vibration and the Z axis. As a result, the two coupling arms 105a and 105b vibrate in a B direction and a B' direction opposite to each other. At this time, the two detection vibration arms 102 perform a flexural vibration in a C direction and a C' direction opposite to each other in order to maintain the balance. A phase of the flexural vibration of the detection vibration arm 102 due to the Coriolis force and a phase of the flexural vibration of the drive vibration arms 101a and 101b are shifted by 90°.

Due to the piezoelectric effect, AC charges based on these flexural vibrations are generated in the detection electrodes 114 and 115 of the detection vibration arms 102. Here, the AC charges generated based on the Coriolis force change according to a magnitude of the Coriolis force, that is, a magnitude of the angular velocity applied to the physical quantity detection element 100.

A rectangular weight portion 103 having a width larger than those of the drive vibration arms 101a and 101b is formed at each tip end of the drive vibration arms 101a and 101b. By forming the weight portions 103 at the tip ends of the drive vibration arms 101a and 101b, the Coriolis force can be increased, and a desired resonance frequency can be obtained with a relatively short vibration arm. Similarly, a weight portion 106 having a width larger than that of the detection vibration arm 102 is formed at a tip end of each detection vibration arm 102. By forming the weight portions 106 at the tip ends of the detection vibration arms 102, the AC charges generated in the detection electrodes 114 and 115 can be increased.

Through a first electrostatic coupling capacitor $C_1$ between the drive electrode 113 and the detection electrode 114 and a second electrostatic coupling capacitor $C_2$ between the drive electrode 113 and the detection electrode 115, an AC frequency component included in a drive signal supplied to the drive electrode 113 propagates to the detection electrodes 114 and 115, and AC charges based on the frequency component are generated. But there is no erroneous detection of the AC charges as an angular velocity, as described later.

When a magnitude of vibration energy of the drive vibration arms 101a and 101b at the time of performing the flexural vibration or a magnitude of an amplitude of the vibration is equal in the two drive vibration arms 101a and 101b, the vibration energy of the drive vibration arms 101a and 101b is balanced, and the detection vibration arm 102 does not perform the flexural vibration in a state where no angular velocity is applied to the physical quantity detection element 100. However, when the balance of the vibration energy of the two drive vibration arms 101a and 101b is lost, the flexural vibration occurs in the detection vibration arm 102 even in a state where no angular velocity is applied to the physical quantity detection element 100. This flexural vibration is called leakage vibration, and is flexural vibration in the C direction and the C' direction similarly to the vibration based on the Coriolis force. AC charges based on the leakage vibration are generated in the detection electrodes 114 and 115. Since a phase of the leakage vibration is shifted by 90° from the phase of the vibration based on the Coriolis force, as will be described later, the AC charges are not erroneously detected as an angular velocity, but in order to improve the detection accuracy of the angular velocity, it is preferable that the leakage vibration does not occur.

For example, by tuning the weights of the four weight portions 103 so that the vibration energy of the two drive vibration arms 101a is equal, the vibration energy of the two drive vibration arms 101b is equal, and a sum of the vibration energy of the two drive vibration arms 101a and a sum of the vibration energy of the two drive vibration arms 101b are equal, it is possible to make the leakage vibration hardly occur. The weight of the weight portion 103 can be tuned by, for example, irradiating the weight portion 103 with laser to cut a part of the weight portion 103.

As described above, the physical quantity detection element 100 outputs, from the detection electrodes 114 and 115, AC charges based on a detected physical quantity and the AC charges based on the drive signal propagating via the first electrostatic coupling capacitor $C_1$ and the second electrostatic coupling capacitor $C_2$. Hereinafter, the AC charges based on a physical quantity may be referred to as a "physical quantity component", and the AC charges based on a drive signal propagating via the first electrostatic coupling capacitor $C_1$ and the second electrostatic coupling capacitor $C_2$ may be referred to as an "electrostatic leakage component". In the embodiment, the physical quantity detected by the physical quantity detection element 100 is an angular velocity corresponding to the Coriolis force.

Referring back to FIG. 1, the physical quantity detection circuit 200 includes a reference voltage circuit 10, the drive circuit 20, the detection circuit 30, an analog-digital conversion circuit 41, an analog-digital conversion circuit 42, a digital signal processing circuit 51, a digital signal processing circuit 52, a failure diagnosis circuit 61, an interface circuit 70, a storage unit 80, and an oscillation circuit 90. The physical quantity detection circuit 200 may be implemented by, for example, a one-chip integrated circuit. The physical quantity detection circuit 200 may have a configuration in which a part of these components are omitted or changed or other components are added.

The reference voltage circuit 10 generates a constant current and a constant voltage such as a reference voltage, which is an analog ground voltage, based on a power supply voltage and a ground voltage supplied respectively from a VDD terminal and a VSS terminal of the physical quantity detection circuit 200, and supplies the constant voltage and the constant current to the drive circuit 20 and the detection circuit 30.

The drive circuit 20 applies a drive signal including a first frequency component for driving the physical quantity detection element 100 to the drive electrode 113 of the physical quantity detection element 100 via the DS terminal. The physical quantity detection element 100 is excited and vibrated by the drive signal. The drive circuit 20 receives, via the DG terminal, an oscillation current generated in the drive electrode 112 by the excitation vibration of the physical quantity detection element 100, and feedback-controls an amplitude level of the drive signal so that an amplitude of the oscillation current is kept constant. The drive circuit 20 generates a detection signal SDET in the same phase as the drive signal and a detection signal QDET having a frequency two times the frequency of the detection signal SDET, and outputs the detection signal SDET and the detection signal QDET to the detection circuit 30.

The detection circuit 30 outputs a physical quantity detection signal SAO corresponding to a physical quantity detected by the physical quantity detection element 100, based on a first physical quantity component included in a first signal output from the detection electrode 114 of the physical quantity detection element 100 and a second physical quantity component included in a second signal output from the detection electrode 115 of the physical quantity detection element 100. The first signal is AC charges received via the S1 terminal of the physical quantity detection circuit 200, and the second signal is AC charges received via the S2 terminal of the physical quantity detection circuit 200. The detection circuit 30 uses the detection signal SDET to detect a physical quantity component that is based on the first physical quantity component included in the first signal and the second physical quantity component included in the second signal, and generates and outputs the physical quantity detection signal SAO that is an analog signal having a voltage level corresponding to a magnitude of the detected physical quantity component. The detection electrode 114 is an example of a "first detection electrode", and the detection electrode 115 is an example of a "second detection electrode".

The detection circuit 30 outputs an electrostatic leakage detection signal QAO based on a first electrostatic leakage component included in the first signal and a second electrostatic leakage component included in the second signal. The drive signal output from the drive circuit 20 includes a second frequency component having a frequency different from that of the first frequency component. The first electrostatic leakage component is a component resulting from the second frequency component propagating to the detection electrode 114 via the first electrostatic coupling capacitor $C_1$ between the drive electrode 113 and the detection electrode 114 of the physical quantity detection element 100. Similarly, the second electrostatic leakage component is a component resulting from the second frequency component propagating to the detection electrode 115 via the second electrostatic coupling capacitor $C_2$ between the drive electrode 113 and the detection electrode 115 of the physical quantity detection element 100. In the embodiment, the second frequency component has a frequency that is two times the frequency of the first frequency component, and is a frequency component generated when the drive circuit 20 generates a drive signal, as will be described later. The detection circuit 30 uses the detection signal QDET to detect an electrostatic leakage component that is based on the first electrostatic leakage component included in the first signal and the second electrostatic leakage component included in the second signal, and generates and outputs the electrostatic leakage detection signal QAO that is an analog signal having a voltage level corresponding to a magnitude of the detected electrostatic leakage component.

The storage unit 80 has a nonvolatile memory (not illustrated), and various types of trimming data for the drive circuit 20 and the detection circuit 30 are stored in the nonvolatile memory. The nonvolatile memory may be implemented as, for example, a MONOS memory or an EEPROM. The MONOS is an abbreviation for metal oxide nitride oxide silicon. The EEPROM is an abbreviation for electrically erasable programmable read-only memory. Further, the storage unit 80 may include a register (not illustrated), and may be configured such that, when the physical quantity detection circuit 200 is powered on, that is, when the voltage of the VDD terminal rises from 0 V to a desired voltage, various types of trimming data stored in the nonvolatile memory are transferred to the register and held therein, and the various types of trimming data held in the register are supplied to the drive circuit 20 and the detection circuit 30.

The analog-digital conversion circuit 41 operates based on a clock signal ADCLK, and converts the physical quantity detection signal SAO, which is an analog signal output from the detection circuit 30, into a physical quantity detection signal SDO, which is a digital signal, and outputs the physical quantity detection signal SDO.

The analog-digital conversion circuit 42 operates based on the clock signal ADCLK, and converts the electrostatic leakage detection signal QAO, which is an analog signal output from the detection circuit 30, into an electrostatic leakage detection signal QDO, which is a digital signal, and outputs the electrostatic leakage detection signal QDO.

The digital signal processing circuit 51 operates based on a master clock signal MCLK, performs predetermined arithmetic processing on the physical quantity detection signal SDO output from the analog-digital conversion circuit 41, and outputs a physical quantity detection signal SDOX obtained by the arithmetic processing.

The digital signal processing circuit 52 operates based on the master clock signal MCLK, performs predetermined arithmetic processing on the electrostatic leakage detection signal QDO output from the analog-digital conversion circuit 42, and outputs an electrostatic leakage detection signal QDOX obtained by the arithmetic processing.

The failure diagnosis circuit 61 operates in response to the master clock signal MCLK, and performs failure diagnosis of the physical quantity detection device 1 based on the electrostatic leakage detection signal QDOX. The failure diagnosis circuit 61 outputs a failure diagnosis result signal QF indicating whether the physical quantity detection device 1 has a failure. If the physical quantity detection device 1 is normal, a value of the electrostatic leakage detection signal QDOX falls in a predetermined first range. On the other hand, for example, when a part of the wiring electrically coupled to the detection electrode 114 of the physical quantity detection element 100 is disconnected or short-circuited, or a part of the wiring electrically coupled to the detection electrode 115 of the physical quantity detection element 100 is disconnected or short-circuited, the value of the electrostatic leakage detection signal QDOX falls outside the first range. Therefore, the failure diagnosis circuit 61 may make a diagnosis that the physical quantity detection device 1 has a failure when the value of the electrostatic leakage detection signal QDOX does not fall in the first range. For example, the first range may be set to include a predetermined value assumed in design when the physical quantity detection device 1 is normal and include a range that can be changed based on the predetermined value due to a change over time. The first range may be fixed or variable. For example, the first range may be variably set in accordance with a value stored in a register that is provided in the storage unit 80 and that is rewritable from the outside of the physical quantity detection circuit 200.

The interface circuit 70 performs processing of outputting the physical quantity detection signal SDOX output from the digital signal processing circuit 51 to the MCU 5, in response to a request from the MCU 5 that is an external device of the physical quantity detection circuit 200. The MCU is an abbreviation for micro control unit. The interface circuit 70 may perform processing of outputting the electrostatic leakage detection signal QDOX output from the digital signal processing circuit 52 to the MCU 5 in response to a request from the MCU 5. In this case, the physical quantity detection circuit 200 may not include the failure diagnosis circuit 61, and the MCU 5 may perform the failure diagnosis similarly to the failure diagnosis circuit 61 based on the electrostatic leakage detection signal QDOX.

In response to a request from the MCU 5, the interface circuit 70 performs processing of reading data stored in the nonvolatile memory or the register of the storage unit 80 and outputting the data to the MCU 5, and processing of writing data input from the MCU 5 to the nonvolatile memory or the register of the storage unit 80. For example, the MCU 5 may perform processing of writing a value for setting the first range described above in a predetermined register.

The interface circuit 70 is an interface circuit of an SPI bus, and receives a selection signal, a clock signal, and a data signal transmitted from the MCU 5 via an SS terminal, a SCLK terminal, and an SI terminal of the physical quantity detection circuit 200, respectively, and outputs a data signal to the MCU 5 via an SO terminal of the physical quantity detection circuit 200. The SPI is an abbreviation for serial peripheral interface. The interface circuit 70 may be an interface circuit corresponding to various buses other than the SPI bus, for example, an I$^2$C bus. The I$^2$C is an abbreviation for inter-integrated circuit.

The oscillation circuit 90 generates the master clock signal MCLK and supplies the master clock signal MCLK to the digital signal processing circuits 51 and 52 and the failure diagnosis circuit 61. The oscillation circuit 90 divides a frequency of the master clock signal MCLK to generate the clock signal ADCLK, and supplies the clock signal ADCLK to the analog-digital conversion circuits 41 and 42. The oscillation circuit 90 may generate the master clock signal MCLK by, for example, a ring oscillator or a CR oscillation circuit.

In the physical quantity detection device 1 according to the first embodiment configured as described above, the physical quantity detection element 100 outputs the first signal that is the AC charges generated in the detection electrode 114 and the second signal that is the AC charges generated in the detection electrode 115, and the physical quantity detection circuit 200 generates the physical quantity detection signal SDOX corresponding to the physical quantity detected by the physical quantity detection element 100 based on the first signal and the second signal output from the physical quantity detection element 100. The physical quantity detection circuit 200 generates the failure diagnosis result signal QF indicating presence or absence of a failure of the physical quantity detection device 1, based on the first signal and the second signal output from the physical quantity detection element 100.

1-2. Configuration of Drive Circuit

Figure 3:
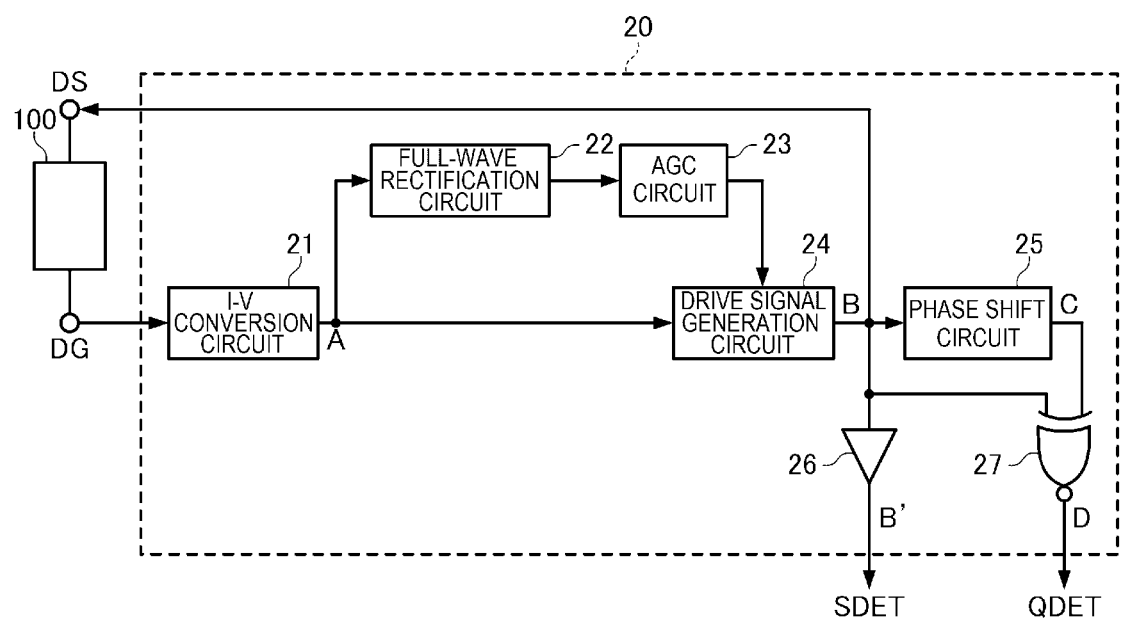
FIG. 3 is a diagram illustrating a configuration example of a drive circuit according to the first embodiment.

FIG. 3 is a diagram illustrating a configuration example of the drive circuit 20 according to the first embodiment. As illustrated in FIG. 3, the drive circuit 20 includes a current-voltage conversion circuit 21, a full-wave rectification circuit 22, an automatic gain control circuit 23, a drive signal generation circuit 24, a phase shift circuit 25, a buffer circuit 26, and an EXNOR circuit 27. The EXNOR is an abbreviation for exclusive NOR.

The oscillation current generated in the drive electrode 112 by the excitation vibration of the physical quantity detection element 100 is input to the current-voltage conversion circuit 21 via the DG terminal, and is converted into an AC voltage signal by the current-voltage conversion circuit 21. The AC voltage signal output from the current-voltage conversion circuit 21 is input to the full-wave rectification circuit 22 and the drive signal generation circuit 24.

The full-wave rectification circuit 22 performs full-wave rectification on the output signal of the current-voltage conversion circuit 21 and outputs a DC signal.

The automatic gain control circuit 23 amplifies the output signal of the full-wave rectification circuit 22 and outputs a signal of a predetermined voltage. The automatic gain control circuit 23 controls the gain of amplification in accordance with a magnitude of the output signal of the full-wave rectification circuit 22 so that the output signal is constant at the predetermined voltage.

The drive signal generation circuit 24 outputs a drive signal obtained by binarizing the output signal of the current-voltage conversion circuit 21. A high-level voltage of the drive signal is a voltage of the output signal of the automatic gain control circuit 23, and is constant at a predetermined voltage. The drive signal is supplied to the drive electrode 113 of the physical quantity detection element 100 via the DS terminal. The physical quantity detection element 100 can continue the excitation vibration by being supplied with the drive signal. Further, by keeping the high-level voltage of the drive signal constant, the drive vibration arms 101*a* and 101*b* of the physical quantity detection element 100 can obtain a constant vibration speed. Therefore, the vibration speed that is the source of the Coriolis force is constant, and the sensitivity can be made more stable.

A fundamental frequency of the drive signal generated in this manner coincides with a frequency f of the flexural vibration of the drive vibration arms 101*a* and 101*b* of the physical quantity detection element 100. Further, a second frequency component having a frequency 2f is generated by the full-wave rectification of the full-wave rectification circuit 22, and is superimposed on the high-level voltage of the drive signal. Therefore, the drive signal includes a first frequency component having the frequency f and the second frequency component having the frequency 2f.

The phase shift circuit 25 outputs a signal obtained by advancing a phase of the drive signal output from the drive signal generation circuit 24 by 90°. The buffer circuit 26 outputs the detection signal SDET in the same phase as the drive signal. The EXNOR circuit 27 outputs the detection signal QDET that is an EXNOR logical signal of the drive signal and the output signal of the phase shift circuit 25. The detection signal SDET is a square-wave voltage signal having a frequency f, and the detection signal QDET is a square-wave voltage signal having a frequency 2f. The detection signals SDET and QDET are supplied to the detection circuit 30.

1-3. Configuration of Detection Circuit

Figure 4:
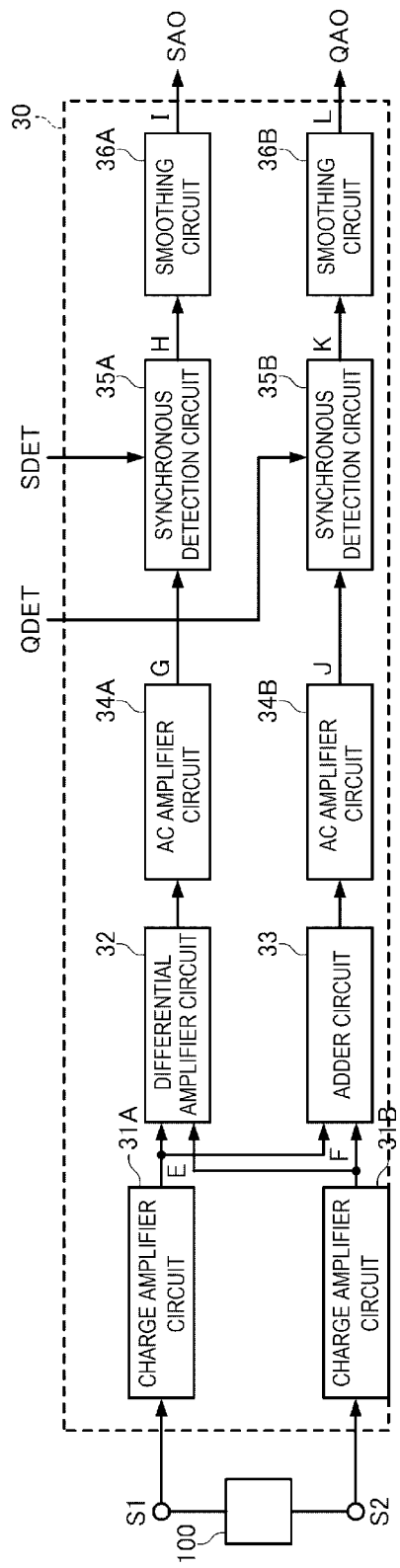
FIG. 4 is a diagram illustrating a configuration example of a detection circuit according to the first embodiment.

FIG. 4 is a diagram illustrating a configuration example of the detection circuit 30 according to the first embodiment. As illustrated in FIG. 4, the detection circuit 30 includes charge amplifier circuits 31A and 31B, a differential amplifier circuit 32, an adder circuit 33, AC amplifier circuits 34A and 34B, synchronous detection circuits 35A and 35B, and smoothing circuits 36A and 36B.

The first signal is input to the charge amplifier circuit 31A via the S1 terminal. As described above, the first signal is AC charges generated in the detection electrode 114 of the physical quantity detection element 100, and includes the first physical quantity component and the first electrostatic leakage component.

The second signal is input to the charge amplifier circuit 31B via the S2 terminal. As described above, the second signal is AC charges generated in the detection electrode 115 of the physical quantity detection element 100, and includes the second physical quantity component and the second electrostatic leakage component.

In the embodiment, as illustrated in FIG. 2, when an angular velocity is applied to the physical quantity detection element 100, the detection vibration arm 102 formed with the detection electrode 114 and the detection vibration arm 102 formed with the detection electrode 115 perform the flexural vibration in opposite directions so as to obtain balance. Therefore, the first physical quantity component included in the first signal and the second physical quantity component included in the second signal are in opposite phases to each other. Here, "the first physical quantity component included in the first signal and the second physical quantity component included in the second signal are in opposite phases to each other" includes not only a case where a phase difference between the two physical quantity components is accurately 180°, but also a case where the phase difference between the two physical quantity components has a slight difference with respect to 180° due to a manufacturing error of the physical quantity detection element 100, an error of a delay time in a signal propagation path, or the like.

In the embodiment, the first electrostatic leakage component included in the first signal and the second electrostatic leakage component included in the second signal are in the same phase as each other. Here, "the first electrostatic leakage component included in the first signal and the second electrostatic leakage component included in the second signal are in the same phase as each other" includes not only a case where a phase difference between the two electrostatic leakage components is accurately 0°, but also a case where the phase difference between the two electrostatic leakage components has a slight difference with respect to 0° due to a manufacturing error of the physical quantity detection element 100, an error of a delay time in a signal propagation path, or the like.

The charge amplifier circuit 31A converts the first signal into an AC voltage signal with reference to a reference voltage $V_{ref}$ generated by the reference voltage circuit 10 and outputs the AC voltage signal, and the charge amplifier circuit 31B converts the second signal into an AC voltage signal with reference to the reference voltage $V_{ref}$ and outputs the AC voltage signal.

The differential amplifier circuit 32 differentially amplifies a signal pair including the output signal of the charge amplifier circuit 31A and the output signal of the charge amplifier circuit 31B. The signal pair is a signal pair based on the first signal and the second signal. As described above, since the first physical quantity component included in the first signal and the second physical quantity component included in the second signal are in opposite phases to each other, the physical quantity component is amplified by the differential amplifier circuit 32. On the other hand, since the first electrostatic leakage component included in the first signal and the second electrostatic leakage component included in the second signal are in the same phase as each other, the electrostatic leakage component is attenuated by the differential amplifier circuit 32. Therefore, in the output signal of the differential amplifier circuit 32, the influence of the electrostatic leakage component on the physical quantity component is reduced. In the output signal of the differential amplifier circuit 32, in order to substantially eliminate the influence of the electrostatic leakage component on the physical quantity component, a difference amount between the first electrostatic leakage component and the second electrostatic leakage component is preferably substantially zero. Here, "the difference amount between the first electrostatic leakage component and the second electrostatic leakage component are substantially zero" means including not only a case where the difference amount is accurately zero, but also a case where the difference amount has a slight difference with respect to zero due to the minimum adjustment resolution of the first electrostatic leakage component or the second electrostatic leakage component or the like, and a case where a measurement value has a slight difference with respect to zero due to a measurement error of the difference amount between the first electrostatic leakage component and the second electrostatic leakage component.

The AC amplifier circuit 34A amplifies the output signal of the differential amplifier circuit 32. An output signal of the AC amplifier circuit 34A is input to the synchronous detection circuit 35A.

The synchronous detection circuit 35A performs synchronous detection using the detection signal SDET, with the output signal of the AC amplifier circuit 34A being used as a detection target signal. The synchronous detection circuit 35A extracts a physical quantity component included in the output signal of the AC amplifier circuit 34A. That is, the synchronous detection circuit 35A functions as a first synchronous detection circuit that performs synchronous detection on the output signal of the AC amplifier circuit 34A, which is a signal based on the output signal of the differential amplifier circuit 32, and outputs a signal corresponding to a difference between the first physical quantity component included in the first signal and the second physical quantity component included in the second signal. The synchronous detection circuit 35A may be, for example, a switch circuit that selects the output signal of the AC amplifier circuit 34A when a voltage level of the detection signal SDET is higher than the reference voltage $V_{ref}$, and that selects a signal obtained by inverting the output signal of the AC amplifier circuit 34A with respect to the reference voltage $V_{ref}$ when the voltage level of the detection signal SDET is lower than the reference voltage $V_{ref}$.

The smoothing circuit 36A smooths an output signal of the synchronous detection circuit 35A into a DC voltage signal. An output signal of the smoothing circuit 36A is output from the detection circuit 30 as the physical quantity detection signal SAO. That is, the smoothing circuit 36A functions as a physical quantity detection signal generation circuit that generates the physical quantity detection signal SAO based on the output signal of the synchronous detection circuit 35A that is the first synchronous detection circuit.

As described above, in the embodiment, the charge amplifier circuits 31A and 31B, the differential amplifier circuit 32, the AC amplifier circuit 34A, the synchronous detection circuit 35A, and the smoothing circuit 36A function as a physical quantity detection signal output circuit that outputs the physical quantity detection signal SAO corresponding to a physical quantity, which is detected by the physical quantity detection element 100, based on the first physical quantity component included in the first signal and the second physical quantity component included in the second signal.

The adder circuit 33 adds up the signal pair including the output signal of the charge amplifier circuit 31A and the output signal of the charge amplifier circuit 31B. As described above, since the first physical quantity component included in the first signal and the second physical quantity component included in the second signal are in opposite phases to each other, the physical quantity component is attenuated by the adder circuit 33. On the other hand, since the first electrostatic leakage component included in the first signal and the second electrostatic leakage component included in the second signal are in the same phase as each other, the electrostatic leakage component is amplified by the adder circuit 33.

The AC amplifier circuit 34B amplifies an output signal of the adder circuit 33. An output signal of the AC amplifier circuit 34B is input to the synchronous detection circuit 35B.

The synchronous detection circuit 35B performs synchronous detection using the detection signal QDET, with the output signal of the AC amplifier circuit 34B being used as a detection target signal. The synchronous detection circuit 35B extracts the electrostatic leakage component included in the output signal of the AC amplifier circuit 34B. That is, the synchronous detection circuit 35B functions as a second synchronous detection circuit that performs synchronous detection on the output signal of the AC amplifier circuit 34B, which is a signal based on the output signal of the adder circuit 33, and outputs a signal corresponding to a sum of the first electrostatic leakage component included in the first signal and the second electrostatic leakage component included in the second signal. The synchronous detection circuit 35B may be, for example, a switch circuit that selects the output signal of the AC amplifier circuit 34B when a voltage level of the detection signal QDET is higher than the reference voltage $V_{ref}$, and that selects a signal obtained by inverting the output signal of the AC amplifier circuit 34B with respect to the reference voltage $V_{ref}$ when the voltage level of the detection signal QDET is lower than the reference voltage $V_{ref}$.

The smoothing circuit 36B smooths an output signal of the synchronous detection circuit 35B into a DC voltage signal. An output signal of the smoothing circuit 36B is output from the detection circuit 30 as the electrostatic leakage detection signal QAO. That is, the smoothing circuit 36B functions as a first failure diagnosis signal generation circuit that generates the electrostatic leakage detection signal QAO as a first failure diagnosis signal based on the output signal of the synchronous detection circuit 35B that is the second synchronous detection circuit.

As described above, in the embodiment, the charge amplifier circuits 31A and 31B, the adder circuit 33, the AC amplifier circuit 34B, the synchronous detection circuit 35B, and the smoothing circuit 36B function as a first failure diagnosis signal output circuit that outputs, as the first failure diagnosis signal, the electrostatic leakage detection signal QAO generated based on the first electrostatic leakage component and the second electrostatic leakage component. The analog-digital conversion circuit 42, the digital signal processing circuit 52, and the failure diagnosis circuit 61 illustrated in FIG. 1 function as a first failure diagnosis circuit that performs failure diagnosis based on the electrostatic leakage detection signal QAO that is the first failure diagnosis signal.

1-4. Examples of Signal Waveform

Figure 5:
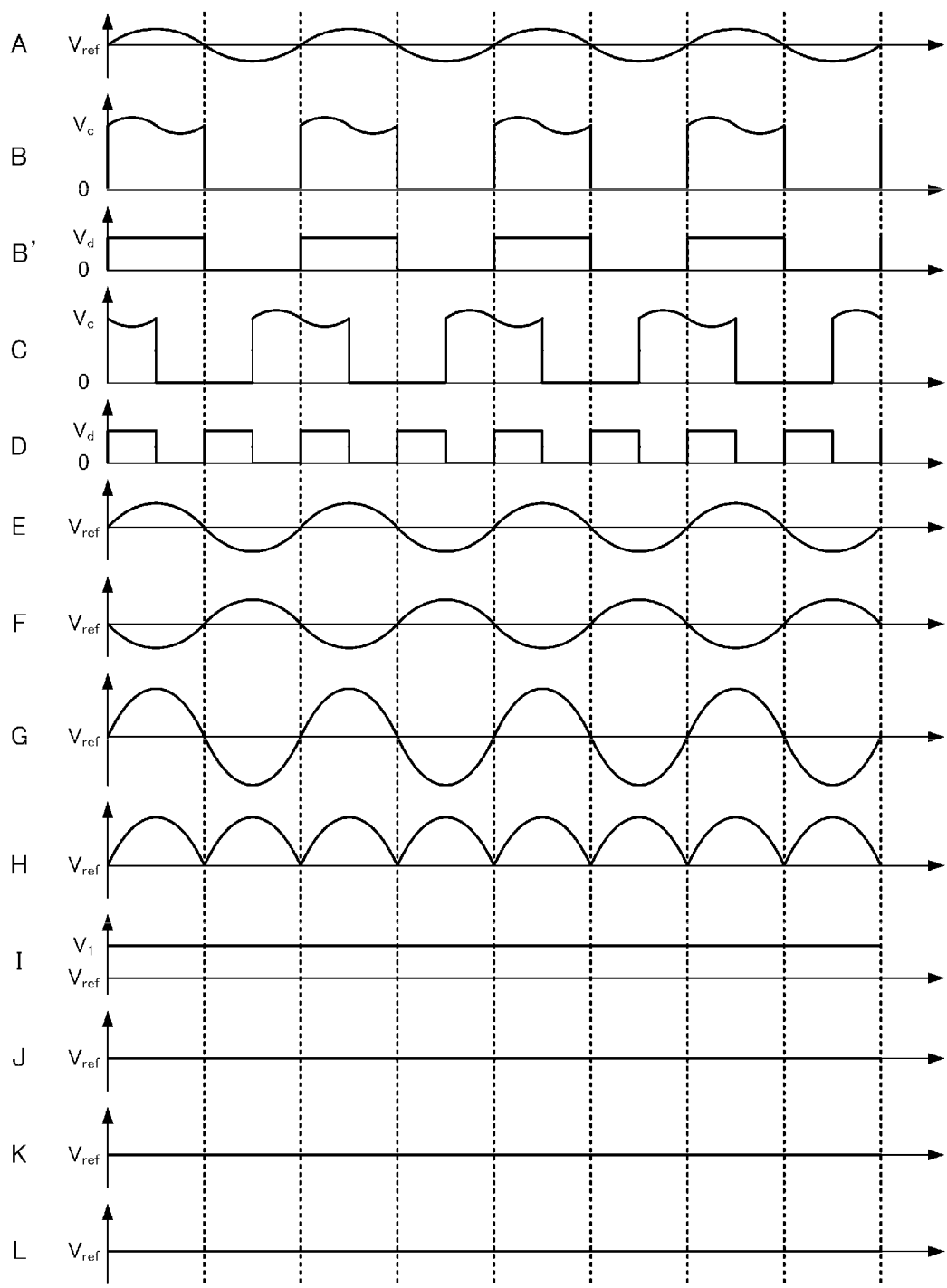
FIG. 5 is a diagram illustrating an example of waveforms of various types of signals with respect to a physical quantity component in the first embodiment.

FIG. 5 is a diagram illustrating an example of waveforms of various signals with respect to a physical quantity component included in the AC charges output from the physical quantity detection element 100. In FIG. 5, waveforms of the signals at points A to D shown in FIG. 3 and waveforms of the signals at points E to L shown in FIG. 4 are illustrated. For the waveforms of the signals, a horizontal axis indicates time and a vertical axis indicates a voltage. FIG. 5 illustrates an example in which a constant angular velocity is applied to the physical quantity detection element 100.

The signal at the point A is the output signal of the current-voltage conversion circuit 21, and is a signal having a constant frequency f centered on the reference voltage $V_{ref}$.

The signal at the point B is the output signal of the drive signal generation circuit 24, that is, a drive signal, is in the same phase as the signal at the point A, and is a square-wave voltage signal having an amplitude of a constant value $V_c$. The signal at the point B includes the first frequency component having the frequency f, and the second frequency component having the frequency 2f is superimposed on a high-level voltage thereof.

The signal at the point B' is the output signal of the buffer circuit 26, that is, the detection signal SDET, is in the same phase as the signal at the point A, and is a square-wave voltage signal having an amplitude of a constant value $V_d$.

The signal at the point C is the output signal of the phase shift circuit 25, and is a square-wave voltage signal whose phase is advanced by 90° with respect to the signal at the point B and whose amplitude is the constant value $V_c$. The signal at the point C includes the first frequency component having the frequency f, and the second frequency component having the frequency 2f is superimposed on a high-level voltage thereof.

The signal at the point D is the output signal of the EXNOR circuit 27, that is, the detection signal QDET, has a frequency two times that of the signal at the point A, and is a square-wave voltage signal having an amplitude of the constant value $V_d$.

The signal at the point E is the first physical quantity component included in the output signal of the charge amplifier circuit 31A, and is a signal in the same phase as the signal at the point A and having the constant frequency f centered on the reference voltage $V_{ref}$.

The signal at the point F is the second physical quantity component included in the output signal of the charge amplifier circuit 31B, and is a signal having a phase different from that of the signal at the point A by 180° and having the constant frequency f centered on the reference voltage $V_{ref}$. The first physical quantity component included in the signal at the point E and the second physical quantity component included in the signal at the point F are in opposite phases to each other and have substantially the same amplitude.

The signal at the point G is a signal obtained by differentially amplifying the physical quantity component included in the output signal of the AC amplifier circuit 34A, that is, the first physical quantity component included in the signal at the point E and the second physical quantity component included in the signal at the point F. The signal at the point G is in the same phase as the signal at the point A and has the constant frequency f centered on the reference voltage $V_{ref}$.

The signal at the point H is a signal obtained by performing full-wave rectification on the physical quantity component included in the output signal of the synchronous detection circuit 35A, that is, the physical quantity component included in the signal at the point G, with reference to the reference voltage $V_{ref}$ by the detection signal SDET that is the signal at the point B'.

The signal at the point I is the physical quantity component included in the output signal of the smoothing circuit 36A, and is a signal having a voltage value $V_1$ corresponding to the physical quantity detected by the physical quantity detection element 100.

The signal at the point J is a signal in which the physical quantity components included in the output signal of the AC amplifier circuit 34B, that is, the first physical quantity component included in the signal at the point E and the second physical quantity component included in the signal at the point F are added and amplified and almost eliminated, and is a signal having a voltage value of the reference voltage $V_{ref}$.

The signal at the point K is a signal obtained by performing full-wave rectification on the physical quantity component included in the output signal of the synchronous detection circuit 35B, that is, the physical quantity component included in the signal at the point J, with reference to the reference voltage $V_{ref}$ by the detection signal QDET that is the signal at the point D, and is a signal having a voltage value of the reference voltage $V_{ref}$.

The signal at the point L is the physical quantity component included in the output signal of the smoothing circuit 36B, and is a signal having a voltage value of the reference voltage $V_{ref}$.

Figure 6:
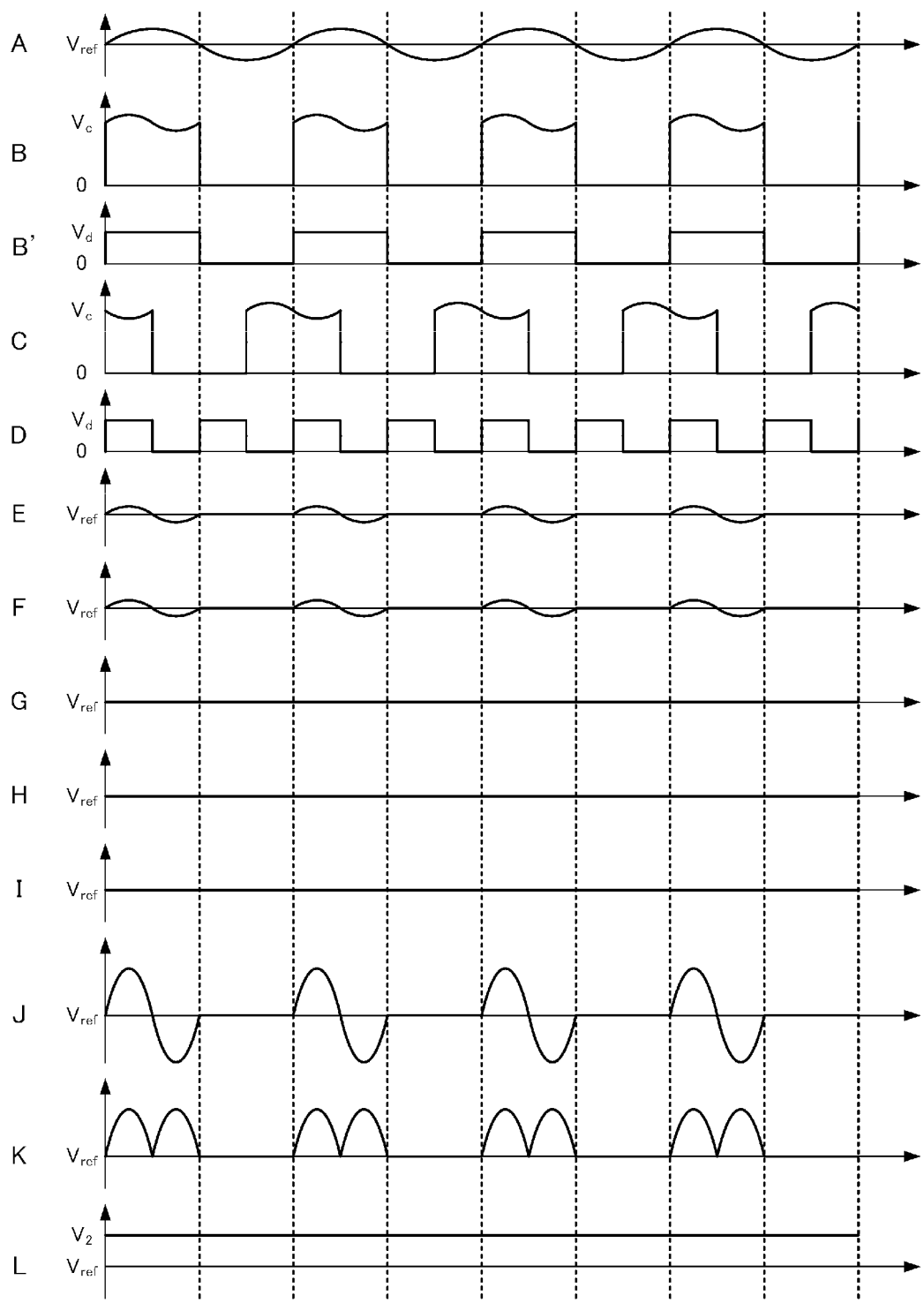
FIG. 6 is a diagram illustrating an example of waveforms of various types of signals with respect to an electrostatic leakage component in the first embodiment.

FIG. 6 is a diagram illustrating an example of waveforms of various signals with respect to an electrostatic leakage component included in the AC charges output from the physical quantity detection element 100. In FIG. 6, waveforms of the signals at points A to D shown in FIG. 3 and waveforms of the signals at points E to L shown in FIG. 4 are illustrated. For the waveforms of the signals, a horizontal axis indicates time and a vertical axis indicates a voltage.

In FIG. 6, the signals at points A to D are the same as those in FIG. 5.

The signal at the point E is the first electrostatic leakage component included in the output signal of the charge amplifier circuit 31A, and is a signal having a constant frequency 2f centered on the reference voltage $V_{ref}$. The first electrostatic leakage component is a component resulting from the second frequency component, which has the frequency 2f and is superimposed on a high-level voltage of the signal at the point B, propagating to the point E via the first electrostatic coupling capacitor $C_1$ between the drive electrode 113 and the detection electrode 114. Therefore, the first electrostatic leakage component included in the signal at the point E is in the same phase as the second frequency component having the frequency 2f included in the signal at the point B.

The signal at the point F is the second electrostatic leakage component included in the output signal of the charge amplifier circuit 31B, and is a signal having a constant frequency 2f centered on the reference voltage $V_{ref}$. The second electrostatic leakage component is a component resulting from the second frequency component, which has the frequency 2f and is superimposed on a high-level voltage of the signal at the point B, propagating to the point F via the second electrostatic coupling capacitor $C_2$ between the drive electrode 113 and the detection electrode 115. Therefore, the second electrostatic leakage component included in the signal at the point F is in the same phase as the second frequency component having the frequency 2f included in the signal at the point B. The first electrostatic leakage component included in the signal at the point E and the second electrostatic leakage component included in the signal at the point F are in the same phase as each other and have substantially the same amplitude.

The signal at the point G is a signal in which electrostatic leakage components included in the output signal of the AC amplifier circuit 34A, that is, the first electrostatic leakage component included in the signal at the point E and the second electrostatic leakage component included in the signal at the point F are differentially amplified and almost eliminated, and is a signal having a voltage value of the reference voltage $V_{ref}$.

The signal at the point H is a signal obtained by performing full-wave rectification on the electrostatic leakage component included in the output signal of the synchronous detection circuit 35A, that is, the electrostatic leakage component included in the signal at the point G, with reference to the reference voltage $V_{ref}$ by the detection signal SDET that is the signal at the point B', and is a signal having a voltage value of the reference voltage $V_{ref}$.

The signal at the point I is an electrostatic leakage component included in the output signal of the smoothing circuit 36A, and is a signal having a voltage value of the reference voltage $V_{ref}$.

The signal at the point J is a signal obtained by adding and amplifying electrostatic leakage components included in the output signal of the AC amplifier circuit 34B, that is, the first electrostatic leakage component included in the signal at the point E and the second electrostatic leakage component included in the signal at the point F. Therefore, the electrostatic leakage component included in the signal at the point J is in the same phase as the second frequency component having the frequency 2f included in the signal at the point B, and is a signal having the constant frequency 2f centered on the reference voltage $V_{ref}$.

The signal at the point K is a signal obtained by performing full-wave rectification on the electrostatic leakage component included in the output signal of the synchronous detection circuit 35B, that is, the electrostatic leakage component included in the signal at the point J, with reference to the reference voltage $V_{ref}$ by the detection signal QDET that is the signal at the point D.

The signal at the point L is the electrostatic leakage component included in the output signal of the smoothing circuit 36B, and is a signal having a voltage value $V_2$ corresponding to the electrostatic leakage occurred in the physical quantity detection element 100.

Actually, the signals at the points E to L have waveforms obtained by adding the waveforms in FIG. 5 and the waveforms in FIG. 6. Here, since the signal at the point I in FIG. 6 is a signal having a voltage value of the reference voltage $V_{ref}$, the output signal of the smoothing circuit 36A, that is, the physical quantity detection signal SAO includes almost no electrostatic leakage component, substantially coincides with the signal at the point I in FIG. 5, and is a signal having a voltage level corresponding to the physical quantity component. As described above, since the physical quantity detection signal SAO includes almost no electrostatic leakage component, an adverse effect of the electrostatic leakage component on the detection of the physical quantity is extremely little. Therefore, the MCU 5 can measure a physical quantity applied to the physical quantity detection device 1 by reading the physical quantity detection signal SDOX generated based on the physical quantity detection signal SAO.

Further, since the signal at the point L in FIG. 5 is a signal having a voltage value of the reference voltage $V_{ref}$, the output signal of the smoothing circuit 36B, that is, the electrostatic leakage detection signal QAO includes almost no physical quantity component, substantially coincides with the signal at the point L in FIG. 6, and is a signal having a voltage level corresponding to the electrostatic leakage component. As described above, since the electrostatic leakage detection signal QAO includes almost no physical quantity component, an adverse effect of the physical quantity component on the failure diagnosis based on the electrostatic leakage component is extremely little. When the wiring of the physical quantity detection element 100 is normal, the voltage of the electrostatic leakage detection signal QAO is a predetermined value. Therefore, when the magnitude of the electrostatic leakage detection signal QDOX generated based on the electrostatic leakage detection signal QAO does not fall in the predetermined first range, the failure diagnosis circuit 61 can make a diagnosis that the wiring of the physical quantity detection element 100 has a failure.

1-5. Operation and Effect

In the physical quantity detection device 1 according to the first embodiment, when a failure such as disconnection or short circuit occurs in the wiring coupled to the physical quantity detection element 100, the magnitudes of the first electrostatic leakage component and the second electrostatic leakage component resulting from the second frequency component included in the drive signal propagating to the detection electrodes 114 and 115 respectively change, and thus the value of the electrostatic leakage detection signal QDOX generated based on the first electrostatic leakage component and the second electrostatic leakage component also changes in the physical quantity detection circuit 200. Therefore, according to the physical quantity detection device 1 of the first embodiment, since the physical quantity detection circuit 200 can generate the electrostatic leakage detection signal QDOX that can be used for failure diagnosis of the wiring coupled to the physical quantity detection element 100, for example, the MCU 5 that is an external device can diagnose a failure of the wiring based on the electrostatic leakage detection signal QDOX.

In the physical quantity detection device 1 according to the first embodiment, since the physical quantity detection circuit 200 can generate the electrostatic leakage detection signal QDOX that can be used for failure diagnosis of the wiring coupled to the physical quantity detection element 100 based on the electrostatic leakage component, the physical quantity detection element 100, which is tuned such that a vibration leakage component is zero or has a magnitude close to zero, can be used. Therefore, according to the physical quantity detection device 1 of the first embodiment, it is possible to lower the possibility that the detection accuracy of the physical quantity is degraded due to the vibration leakage component.

According to the physical quantity detection device 1 of the first embodiment, since the full-wave rectification circuit 22 necessary for generating the drive signal can also be used as a circuit for generating the second frequency component necessary for the failure diagnosis based on the electrostatic leakage component, a dedicated circuit for generating the second frequency component is not necessary.

According to the physical quantity detection device 1 of the first embodiment, the physical quantity detection circuit 200 includes the failure diagnosis circuit 61 that performs failure diagnosis based on the electrostatic leakage detection signal QDOX. Accordingly, when a failure such as disconnection or short circuit occurs in the wiring coupled to the physical quantity detection element 100, since the electrostatic leakage detection signal QDOX changes, the failure of the wiring can be diagnosed.

In the physical quantity detection device 1 according to the first embodiment, since the physical quantity component included in the first signal output from the detection electrode 114 and the physical quantity component included in the second signal output from the detection electrode 115 are in opposite phases to each other, the physical quantity component is amplified by the differential amplifier circuit 32 and attenuated by the adder circuit 33 in the physical quantity detection circuit 200. Therefore, according to the physical quantity detection device 1 of the first embodiment, the physical quantity detection circuit 200 can generate the physical quantity detection signal SDOX with high accuracy, and the possibility that the accuracy of the electrostatic leakage detection signal QDOX is degraded due to the physical quantity component is lowered.

In the physical quantity detection device 1 according to the first embodiment, since the first electrostatic leakage component included in the first signal and the second electrostatic leakage component included in the second signal are in the same phase, in the physical quantity detection circuit 200, the electrostatic leakage component is amplified by the adder circuit 33 and attenuated by the differential amplifier circuit 32. Therefore, according to the physical quantity detection device 1 of the first embodiment, the physical quantity detection circuit 200 can generate the electrostatic leakage detection signal QDOX with high accuracy, and the possibility that the accuracy of the physical quantity detection signal SDOX is degraded due to the electrostatic leakage component is lowered.

2. Second Embodiment

With respect to the physical quantity detection device 1 according to a second embodiment, the same components as those of the first embodiment are denoted by the same reference signs, descriptions overlapping with those in the first embodiment are omitted or simplified, and contents different from those of the first embodiment will be mainly described.

Figure 7:
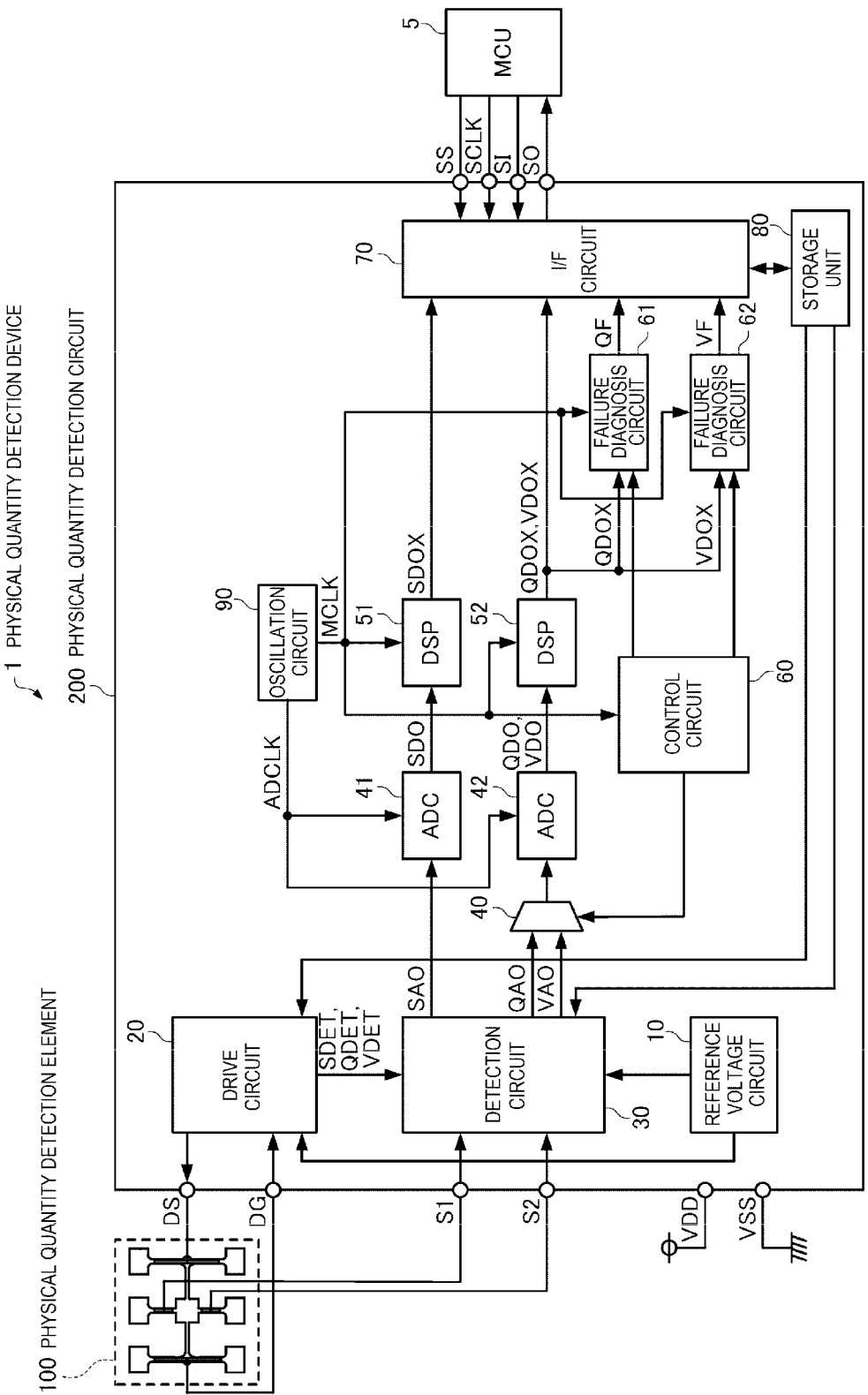
FIG. 7 is a functional block diagram of a physical quantity detection device according to a second embodiment.

FIG. 7 is a functional block diagram of the physical quantity detection device according to the second embodiment. As illustrated in FIG. 7, the physical quantity detection device 1 according to the second embodiment includes the physical quantity detection element 100 and the physical quantity detection circuit 200. Since a configuration and a function of the physical quantity detection element 100 are the same as those of the first embodiment, a description thereof will be omitted.

As described above, since the weights of the four weight portions 103 of the physical quantity detection element 100 are tuned, leakage vibration hardly occurs if the physical quantity detection element 100 is normal. But in a case where the physical quantity detection element 100 has a failure, for example, in a case where a crack or the like occurs in at least one of the drive vibration arms 101a and 101b and the detection vibration arms 102, the balance of vibration energy of the drive vibration arms 101a and 101b is lost, and leakage vibration occurs. Therefore, when the physical quantity detection element 100 has a failure, the physical quantity detection element 100 outputs AC charges, which are based on the leakage vibration, from the detection electrodes 114 and 115. Hereinafter, the AC charges based on the leakage vibration may be referred to as a "vibration leakage component".

As illustrate in FIG. 7, similarly to the first embodiment, the physical quantity detection circuit 200 according to the second embodiment includes the reference voltage circuit 10, the drive circuit 20, the detection circuit 30, the analog-digital conversion circuit 41, the analog-digital conversion circuit 42, the digital signal processing circuit 51, the digital signal processing circuit 52, the failure diagnosis circuit 61, the interface circuit 70, the storage unit 80, and the oscillation circuit 90. Further, the physical quantity detection circuit 200 according to the second embodiment further includes a selector 40, a control circuit 60, and a failure diagnosis circuit 62. The physical quantity detection circuit 200 may be implemented by, for example, a one-chip integrated circuit. The physical quantity detection circuit 200 may have a configuration in which a part of these components are omitted or changed or other components are added.

The functions of the reference voltage circuit 10, the analog-digital conversion circuit 41, the digital signal processing circuit 51, the failure diagnosis circuit 61, the storage unit 80, and the oscillation circuit 90 are the same as those in the first embodiment, and thus a description thereof will be omitted.

The drive circuit 20 has the same function as in the first embodiment, and further generates a detection signal VDET having a phase different from that of a drive signal by 90° and outputs the detection signal VDET to the detection circuit 30.

The detection circuit 30 has the same function as in the first embodiment, and further outputs a vibration leakage detection signal VAO based on a first vibration leakage component included in a first signal output from the detection electrode 114 of the physical quantity detection element 100 and a second vibration leakage component included in a second signal output from the detection electrode 115 of the physical quantity detection element 100. As described above, the first signal is AC charges received via the S1 terminal of the physical quantity detection circuit 200, and the second signal is AC charges received via the S2 terminal of the physical quantity detection circuit 200. The first vibration leakage component is a component based on the vibration of the physical quantity detection element 100, and is included in the first signal when the physical quantity detection element 100 has a failure. Similarly, the second vibration leakage component is a component based on the vibration of the physical quantity detection element 100, and is included in the second signal when the physical quantity detection element 100 has a failure. The detection circuit 30 uses the detection signal VDET to detect a vibration leakage component based on the first vibration leakage component included in the first signal and the second vibration leakage component included in the second signal, and generates and outputs the vibration leakage detection signal VAO that is an analog signal having a voltage level corresponding to a magnitude of the detected vibration leakage component.

The selector 40 selects the electrostatic leakage detection signal QAO and the vibration leakage detection signal VAO in a time division manner in accordance with a control signal output from the control circuit 60, and outputs the selected signals to the analog-digital conversion circuit 42.

The analog-digital conversion circuit 42 operates based on the clock signal ADCLK generated by the oscillation circuit 90, converts, in a time division manner, the electrostatic leakage detection signal QAO and the vibration leakage detection signal VAO that are analog signals output in a time division manner from the selector 40 into an electrostatic leakage detection signal QDO and a vibration leakage detection signal VDO that are digital signals, respectively, and outputs the electrostatic leakage detection signal QDO and the vibration leakage detection signal VDO.

The digital signal processing circuit 52 operates based on the master clock signal MCLK generated by the oscillation circuit 90, performs predetermined arithmetic processing on the electrostatic leakage detection signal QDO and the vibration leakage detection signal VDO output in a time division manner from the analog-digital conversion circuit 42, and outputs the electrostatic leakage detection signal QDOX and a vibration leakage detection signal VDOX obtained by the arithmetic processing.

The failure diagnosis circuit 62 operates in response to the master clock signal MCLK, and performs failure diagnosis of the physical quantity detection device 1 based on the vibration leakage detection signal VDOX. The failure diagnosis circuit 62 outputs a failure diagnosis result signal VF indicating whether the physical quantity detection device 1 has a failure. If the physical quantity detection device 1 is normal, a value of the vibration leakage detection signal VDOX falls in a predetermined second range. On the other hand, for example, when a part of the physical quantity detection element 100 is damaged, the value of the vibration leakage detection signal VDOX falls outside the second range. Therefore, the failure diagnosis circuit 62 may make a diagnosis that the physical quantity detection device 1 has a failure when the value of the vibration leakage detection signal VDOX does not fall in the second range. For example, the second range may be set to include a predetermined value assumed in design when the physical quantity detection device 1 is normal and include a range that can be changed based on the predetermined value due to a change over time. The second range may be fixed or variable. For example, the second range may be variably set in accordance with a value stored in a register that is provided in the storage unit 80 and that is rewritable from the outside of the physical quantity detection circuit 200.

The control circuit 60 operates in response to the master clock signal MCLK, and generates a control signal for controlling the operation of the selector 40 and an enable signal for operating each of the failure diagnosis circuits 61 and 62.

The interface circuit 70 has the same function as in the first embodiment, and further may perform processing of outputting the electrostatic leakage detection signal QDOX and the vibration leakage detection signal VDOX, which are output in a time division manner from the digital signal processing circuit 52, to the MCU 5 in response to a request from the MCU 5. In this case, the physical quantity detection circuit 200 may not include the failure diagnosis circuit 62, and the MCU 5 may perform the failure diagnosis similarly to the failure diagnosis circuit 62 based on the vibration leakage detection signal VDOX. The MCU 5 may perform processing of writing a value for setting the second range described above in a predetermined register.

In the physical quantity detection device 1 according to the second embodiment configured as described above, the physical quantity detection element 100 outputs the first signal that is the AC charges generated in the detection electrode 114 and the second signal that is the AC charges generated in the detection electrode 115, and the physical quantity detection circuit 200 generates the physical quantity detection signal SDOX corresponding to the physical quantity detected by the physical quantity detection element 100 based on the first signal and the second signal output from the physical quantity detection element 100. The physical quantity detection circuit 200 generates failure diagnosis result signals QF and VF indicating presence or absence of a failure of the physical quantity detection device 1, based on the first signal and the second signal output from the physical quantity detection element 100.

Figure 8:
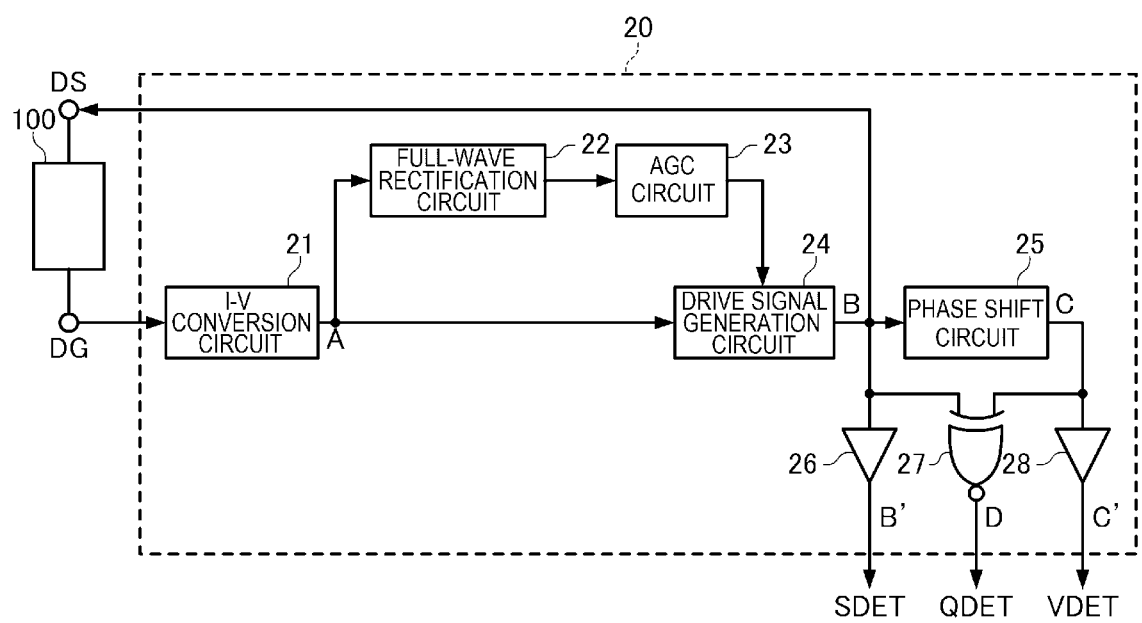
FIG. 8 is a diagram illustrating a configuration example of a drive circuit according to the second embodiment.

FIG. 8 is a diagram illustrating a configuration example of the drive circuit 20 in the second embodiment. As illustrated in FIG. 8, similarly to the drive circuit 20 in the first embodiment, the drive circuit 20 in the second embodiment includes the current-voltage conversion circuit 21, the full-wave rectification circuit 22, the automatic gain control circuit 23, the drive signal generation circuit 24, the phase shift circuit 25, the buffer circuit 26, the EXNOR circuit 27, and a buffer circuit 28. The functions of the current-voltage conversion circuit 21, the full-wave rectification circuit 22, the automatic gain control circuit 23, the drive signal generation circuit 24, the phase shift circuit 25, the buffer circuit 26, and the EXNOR circuit 27 are the same as those in the first embodiment, and thus a description thereof will be omitted. The buffer circuit 28 outputs the detection signal VDET in the same phase as the output signal of the phase shift circuit 25. The detection signal VDET is a square-wave voltage signal having a frequency f whose phase is advanced by 90° with respect to that of the detection signal SDET, and is supplied to the detection circuit 30 together with the detection signals SDET and QDET.

Figure 9:
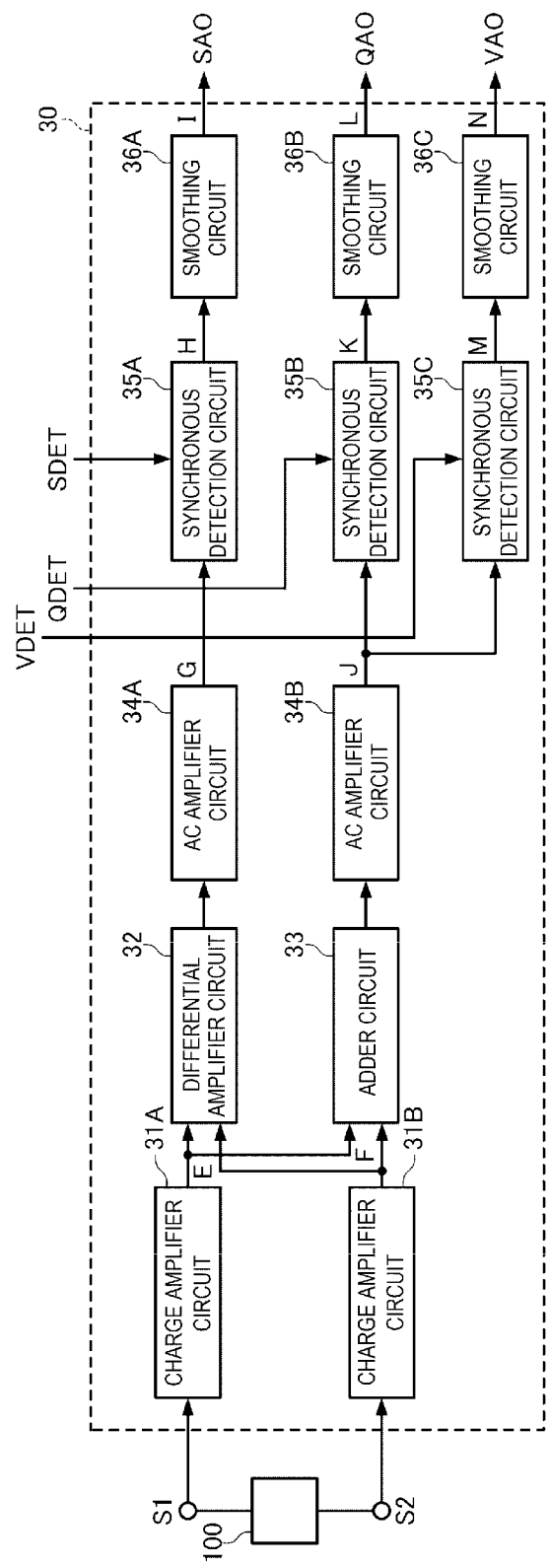
FIG. 9 is a diagram illustrating a configuration example of a detection circuit according to the second embodiment.

FIG. 9 is a diagram illustrating a configuration example of the detection circuit 30 in the second embodiment. As illustrated in FIG. 9, similarly to the detection circuit 30 in the first embodiment, the detection circuit 30 in the second embodiment includes the charge amplifier circuits 31A and 31B, the differential amplifier circuit 32, the adder circuit 33, the AC amplifier circuits 34A and 34B, the synchronous detection circuits 35A and 35B, and the smoothing circuits 36A and 36B. Since the functions of the charge amplifier circuits 31A and 31B, the differential amplifier circuit 32, the adder circuit 33, the AC amplifier circuits 34A and 34B, the synchronous detection circuits 35A and 35B, and the smoothing circuits 36A and 36B are the same as those in the first embodiment, a description thereof will be omitted. Further, the detection circuit 30 in the second embodiment includes a synchronous detection circuit 35C and a smoothing circuit 36C.

The first signal input to the charge amplifier circuit 31A via the S1 terminal includes the first physical quantity component and the first electrostatic leakage component, and further includes the first vibration leakage component when the physical quantity detection element 100 has a failure. Similarly, the second signal input to the charge amplifier circuit 31B via the S2 terminal includes the second physical quantity component and the second electrostatic leakage component, and further includes the second vibration leakage component when the physical quantity detection element 100 has a failure.

In the embodiment, when the physical quantity detection element 100 has a failure, the first vibration leakage component included in the first signal and the second vibration leakage component included in the second signal are in the same phase as each other. Here, "the first vibration leakage component included in the first signal and the second vibration leakage component included in the second signal are in the same phase as each other" includes not only a case where a phase difference between the two vibration leakage components is accurately 0°, but also a case where the phase difference between the two vibration leakage components has a slight difference with respect to 0° due to a manufacturing error of the physical quantity detection element 100, an error of a delay time in a signal propagation path, or the like.

Since the first vibration leakage component included in the first signal and the second vibration leakage component included in the second signal are in the same phase as each other, the vibration leakage component is attenuated by the differential amplifier circuit 32. Therefore, even when the physical quantity detection element 100 has a failure, the influence of the vibration leakage component on the physical quantity component is reduced in the output signal of the differential amplifier circuit 32. In the output signal of the differential amplifier circuit 32, in order to substantially eliminate the influence of the vibration leakage component on the physical quantity component, a difference amount between the first vibration leakage component and the second vibration leakage component is preferably substantially zero. Here, "the difference amount between the first vibration leakage component and the second vibration leakage component is substantially zero" means including not only a case where the difference amount is accurately zero, but also a case where the difference amount has a slight difference with respect to zero due to the minimum adjustment resolution of the first vibration leakage component or the second vibration leakage component or the like, and a case where a measurement value has a slight difference with respect to zero due to a measurement error of the difference amount between the first vibration leakage component and the second vibration leakage component.

Since the first vibration leakage component included in the first signal and the second vibration leakage component included in the second signal are in the same phase as each other, the vibration leakage component is amplified by the adder circuit 33 and further amplified by the AC amplifier circuit 34B.

The synchronous detection circuit 35C performs synchronous detection using the detection signal VDET, with the output signal of the AC amplifier circuit 34B being used as a detection target signal. The synchronous detection circuit 35B extracts the vibration leakage component included in the output signal of the AC amplifier circuit 34B.

That is, the synchronous detection circuit 35C functions as a third synchronous detection circuit that performs synchronous detection on the output signal of the AC amplifier circuit 34B, which is a signal based on the output signal of the adder circuit 33, and outputs a signal corresponding to a sum of the first vibration leakage component included in the first signal and the second vibration leakage component included in the second signal. The synchronous detection circuit 35C may be, for example, a switch circuit that selects the output signal of the AC amplifier circuit 34B when a voltage level of the detection signal VDET is higher than the reference voltage $V_{ref}$, and that selects a signal obtained by inverting the output signal of the AC amplifier circuit 34B with respect to the reference voltage $V_{ref}$ when the voltage level of the detection signal VDET is lower than the reference voltage $V_{ref}$.

The smoothing circuit 36C smooths the output signal of the synchronous detection circuit 35C into a DC voltage signal. The output signal of the smoothing circuit 36C is output from the detection circuit 30 as the vibration leakage detection signal VAO. That is, the smoothing circuit 36C functions as a second failure diagnosis signal generation circuit that generates the vibration leakage detection signal VAO as a second failure diagnosis signal based on the output signal of the synchronous detection circuit 35C that is the third synchronous detection circuit.

As described above, in the embodiment, the charge amplifier circuits 31A and 31B, the adder circuit 33, the AC amplifier circuit 34B, the synchronous detection circuit 35B, and the smoothing circuit 36B function as a first failure diagnosis signal output circuit that outputs, as a first failure diagnosis signal, the electrostatic leakage detection signal QAO generated based on the first electrostatic leakage component and the second electrostatic leakage component. The charge amplifier circuits 31A and 31B, the adder circuit 33, the AC amplifier circuit 34B, the synchronous detection circuit 35C, and the smoothing circuit 36C function as a second failure diagnosis signal output circuit that outputs, as a second failure diagnosis signal, the vibration leakage detection signal VAO generated based on the first vibration leakage component and the second vibration leakage component. The analog-digital conversion circuit 42, the digital signal processing circuit 52, and the failure diagnosis circuit 61 illustrated in FIG. 7 function as a first failure diagnosis circuit that performs failure diagnosis based on the electrostatic leakage detection signal QAO that is the first failure diagnosis signal. The analog-digital conversion circuit 42, the digital signal processing circuit 52, and the failure diagnosis circuit 62 illustrated in FIG. 7 function as a second failure diagnosis circuit that performs failure diagnosis based on the vibration leakage detection signal VAO that is the second failure diagnosis signal.

Figure 10:
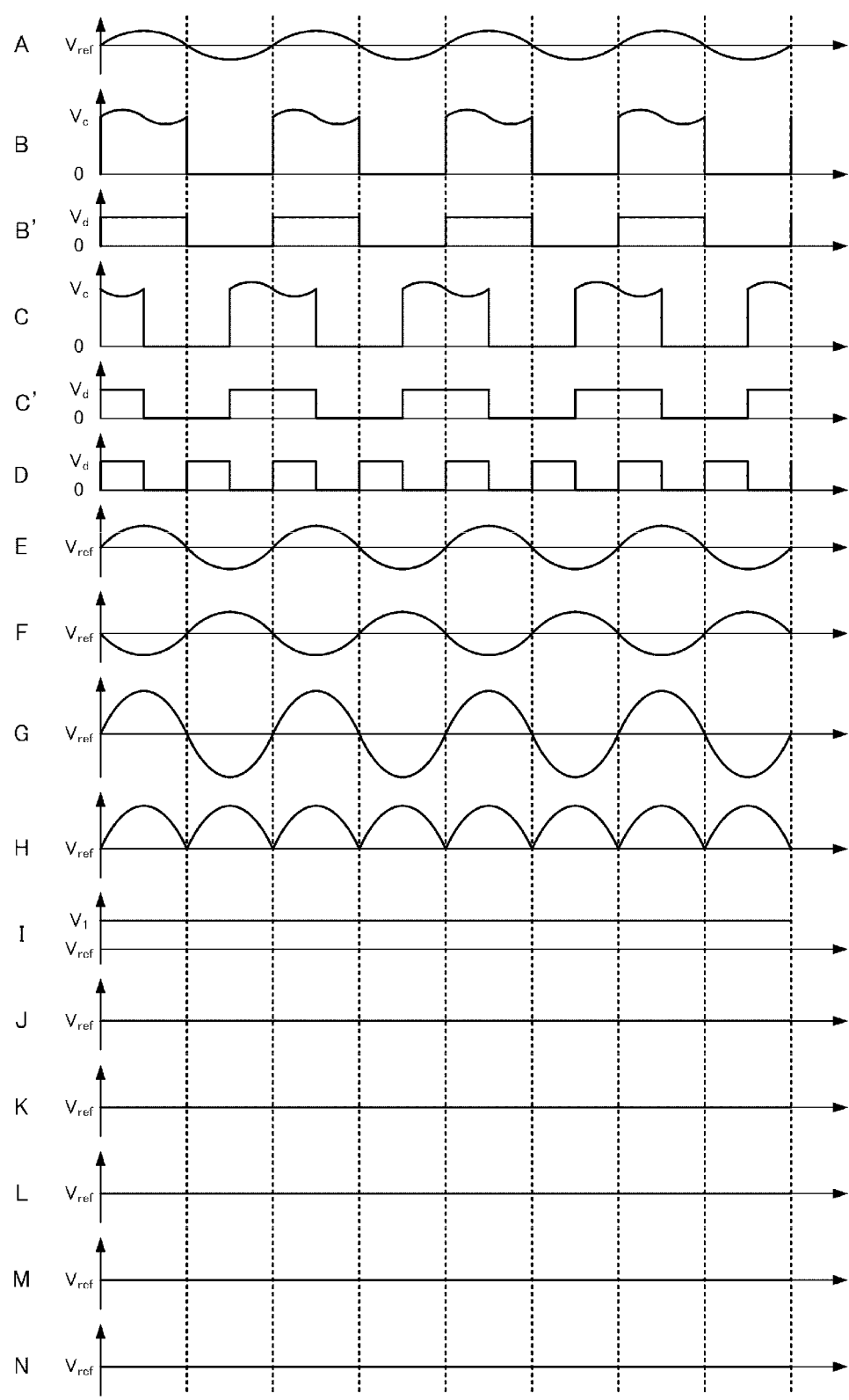
FIG. 10 is a diagram illustrating an example of waveforms of various types of signals with respect to a physical quantity component in the second embodiment.

FIG. 10 is a diagram illustrating an example of waveforms of various signals with respect to a physical quantity component included in the AC charges output from the physical quantity detection element 100. In FIG. 10, waveforms of the signals at points A to D shown in FIG. 8 and waveforms of the signals at points E to N shown in FIG. 9 are illustrated. For the waveforms of the signals, a horizontal axis indicates time and a vertical axis indicates a voltage. FIG. 10 illustrates an example in which a constant angular velocity is applied to the physical quantity detection element 100.

In FIG. 10, the signals at points A to C and the signals at points D to L are the same as those in FIG. 5.

The signal at the point C' is the output signal of the buffer circuit 28, that is, the detection signal VDET, and is a square-wave voltage signal whose phase is advanced by 90° with respect to the signal at the point A and whose amplitude is the constant value $V_d$.

The signal at the point M is a signal obtained by performing full-wave rectification on the physical quantity component included in the output signal of the synchronous detection circuit 35C, that is, the physical quantity component included in the signal at the point J, with reference to the reference voltage $V_{ref}$ by the detection signal VDET that is the signal at the point C', and is a signal having a voltage value of the reference voltage $V_{ref}$.

The signal at the point N is the physical quantity component included in the output signal of the smoothing circuit 36C, and is a signal having a voltage value of the reference voltage $V_{ref}$.

Figure 11:
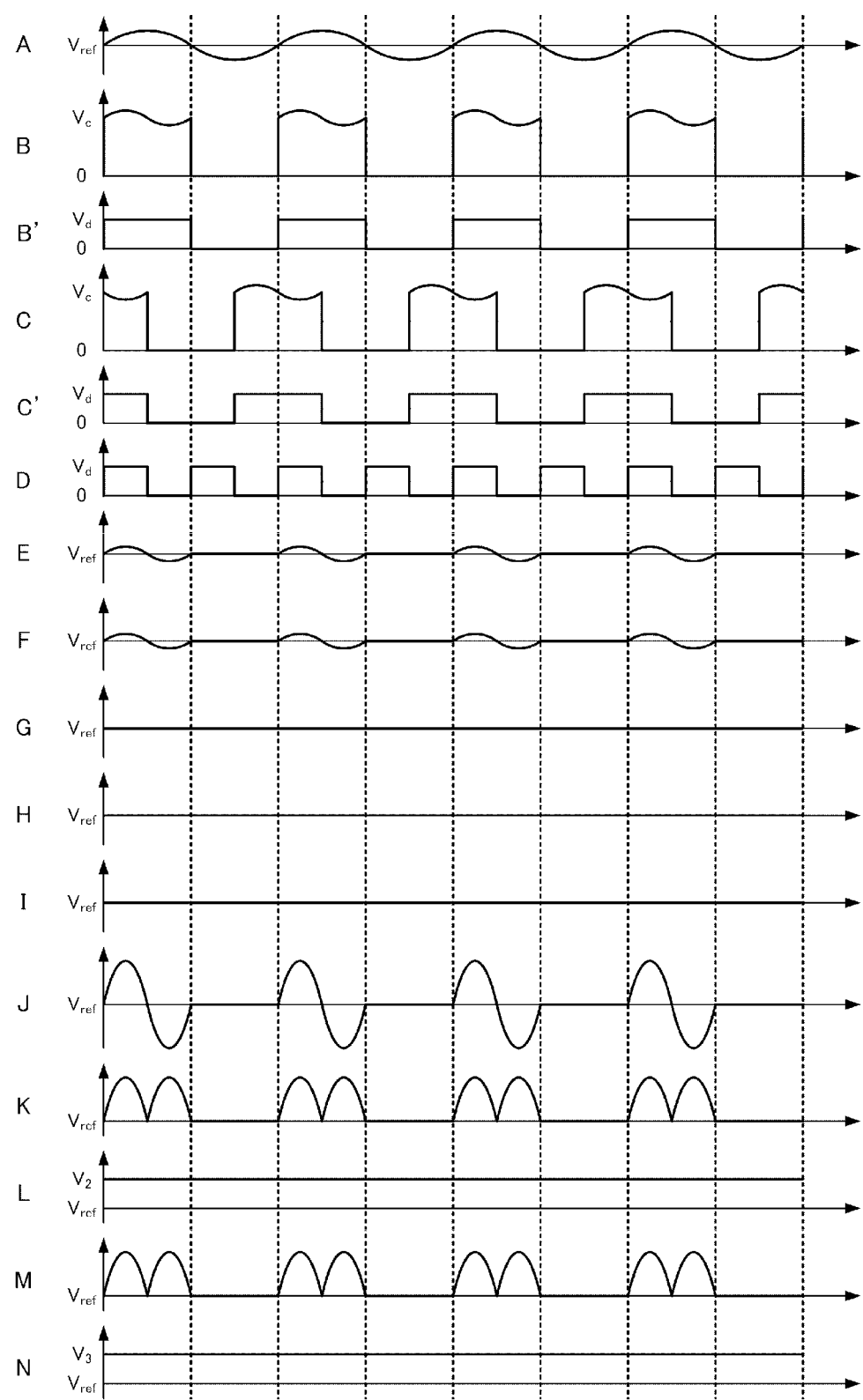
FIG. 11 is a diagram illustrating an example of waveforms of various types of signals with respect to an electrostatic leakage component in the second embodiment.

FIG. 11 is a diagram illustrating an example of waveforms of various signals with respect to an electrostatic leakage component included in the AC charges output from the physical quantity detection element 100. In FIG. 11, waveforms of the signals at points A to D shown in FIG. 8 and waveforms of the signals at points E to N shown in FIG. 9 are illustrated. For the waveforms of the signals, a horizontal axis indicates time and a vertical axis indicates a voltage.

In FIG. 11, the signals at points A to C and the signals at points D to L are the same as those in FIG. 6. The signal at the point C' is the same as that in FIG. 10.

The signal at the point M is a signal obtained by performing full-wave rectification on the electrostatic leakage component included in the output signal of the synchronous detection circuit 35C, that is, the electrostatic leakage component included in the signal at the point J, with reference to the reference voltage $V_{ref}$ by the detection signal VDET that is the signal at the point C'.

The signal at the point N is the electrostatic leakage component included in the output signal of the smoothing circuit 36C, and is a signal having a voltage value $V_3$ corresponding to the electrostatic leakage occurred in the physical quantity detection element 100.

Figure 12:
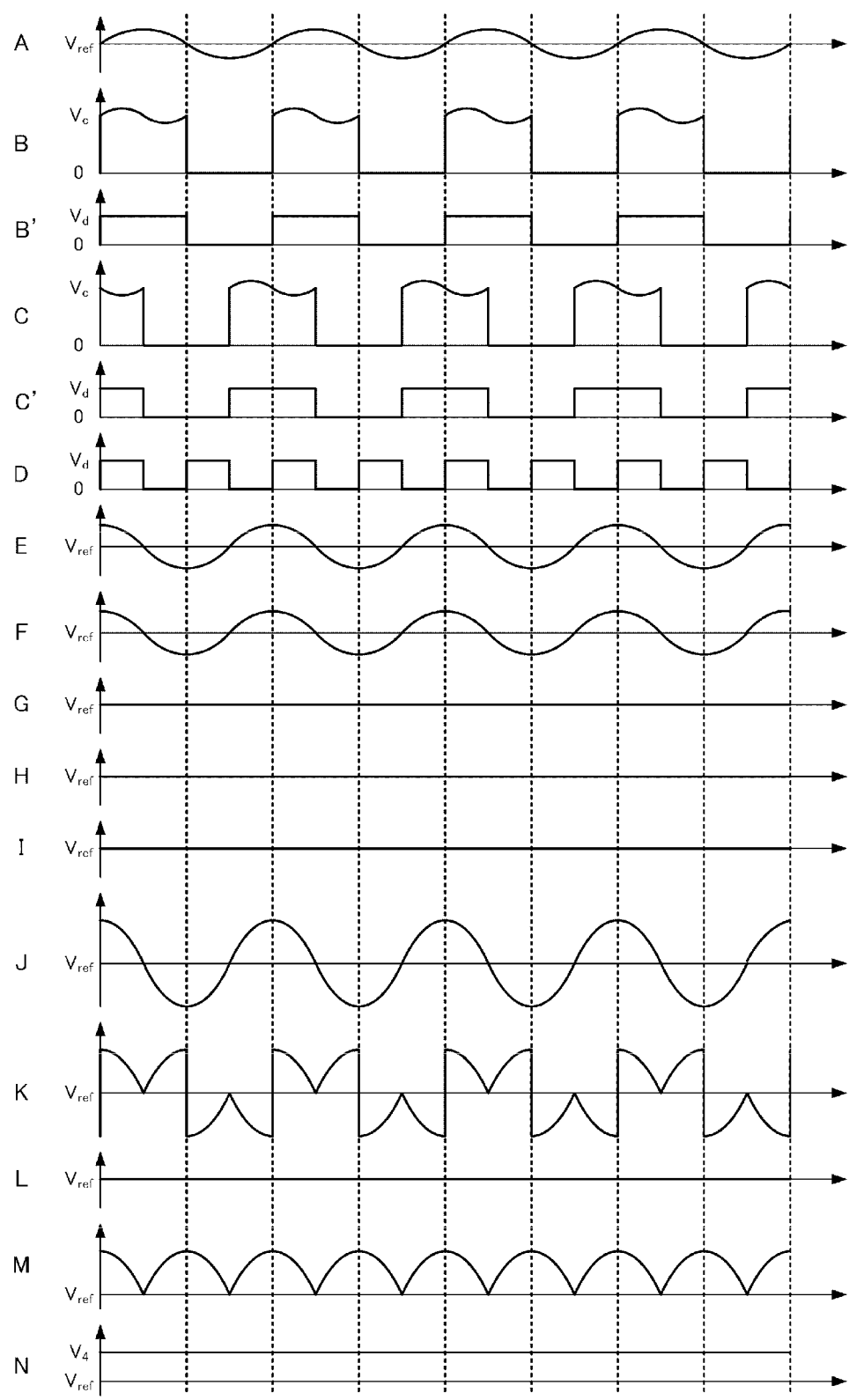
FIG. 12 is a diagram illustrating an example of waveforms of various types of signals with respect to a vibration leakage component in the second embodiment.

FIG. 12 is a diagram illustrating an example of waveforms of various signals with respect to the vibration leakage component included in the AC charges output from the physical quantity detection element 100 in a case where the physical quantity detection element 100 has a failure. In FIG. 12, waveforms of the signals at points A to D shown in FIG. 8 and waveforms of the signals at points E to N shown in FIG. 9 are illustrated. For the waveforms of the signals, a horizontal axis indicates time and a vertical axis indicates a voltage.

In FIG. 12, the signals at points A to D are the same as those in FIGS. 10 and 11.

The signal at the point E is the first vibration leakage component included in the output signal of the charge amplifier circuit 31A, and is a signal having a phase advanced by 90° with respect to that of the signal at the point A and having the constant frequency f centered on the reference voltage $V_{ref}$.

The signal at the point F is the second vibration leakage component included in the output signal of the charge amplifier circuit 31B, and is a signal having a phase advanced by 90° with respect to the signal at the point A and having the constant frequency f centered on the reference voltage $V_{ref}$. The first vibration leakage component included in the signal at the point E and the second vibration leakage component included in the signal at the point F are in the same phase as each other and have substantially the same amplitude.

The signal at the point G is a signal in which vibration leakage components included in the output signal of the AC amplifier circuit 34A, that is, the first vibration leakage component included in the signal at the point E and the second vibration leakage component included in the signal at the point F are differentially amplified and almost eliminated, and is a signal having a voltage value of the reference voltage $V_{ref}$.

The signal at the point H is a signal obtained by performing full-wave rectification on the vibration leakage component included in the output signal of the synchronous detection circuit 35A, that is, the vibration leakage component included in the signal at the point G, with reference to the reference voltage $V_{ref}$ by the detection signal SDET that is the signal at the point B', and is a signal having a voltage value of the reference voltage $V_{ref}$.

The signal at the point I is a vibration leakage component included in the output signal of the smoothing circuit 36A, and is a signal having a voltage value of the reference voltage $V_{ref}$.

The signal at the point J is a signal obtained by adding and amplifying the vibration leakage components included in the output signal of the AC amplifier circuit 34B, that is, the first vibration leakage component included in the signal at the point E and the second vibration leakage component included in the signal at the point F. The signal at the point J has a phase advanced by 90° with respect to that of the signal at the point A and has the constant frequency f centered on the reference voltage $V_{ref}$.

The signal at the point K is a signal obtained by performing full-wave rectification on the vibration leakage component included in the output signal of the synchronous detection circuit 35B, that is, the vibration leakage component included in the signal at the point J, with reference to the reference voltage $V_{ref}$ by the detection signal QDET that is the signal at the point D.

The signal at the point L is the vibration leakage component included in the output signal of the smoothing circuit 36B, and is a signal having a voltage value of the reference voltage $V_{ref}$.

The signal at the point M is a signal obtained by performing full-wave rectification on the vibration leakage component included in the output signal of the synchronous detection circuit 35C, that is, the vibration leakage component included in the signal at the point J, with reference to the reference voltage $V_{ref}$ by the detection signal VDET that is the signal at the point C'.

The signal at the point N is a vibration leakage component included in the output signal of the smoothing circuit 36C, and is a signal having a voltage value $V_4$ corresponding to the vibration leakage occurred in the physical quantity detection element 100.

Actually, the signals at the points E to N have waveforms obtained by adding the waveforms in FIG. 10, the waveforms in FIG. 11, and the waveforms in FIG. 12. Here, since both the signal at the point I in FIG. 11 and the signal at the point I in FIG. 12 are signals having a voltage value of the reference voltage $V_{ref}$, the output signal of the smoothing circuit 36A, that is, the physical quantity detection signal SAO almost includes no electrostatic leakage component and vibration leakage component, substantially coincides with the signal at the point I in FIG. 10, and is a signal having a voltage level corresponding to the physical quantity component. As described above, since the physical quantity detection signal SAO includes almost no electrostatic leakage component and vibration leakage component, an adverse effect of the electrostatic leakage component and the vibration leakage component on the detection of a physical quantity is extremely little. Therefore, the MCU 5 can measure a physical quantity applied to the physical quantity detection device 1 by reading the physical quantity detection signal SDOX generated based on the physical quantity detection signal SAO.

In addition, since both the signal at the point L in FIG. 10 and the signal at the point L in FIG. 12 are signals having a voltage value of the reference voltage $V_{ref}$, the output signal of the smoothing circuit 36B, that is, the electrostatic leakage detection signal QAO includes almost no physical quantity component and vibration leakage component, substantially coincides with the signal at the point L in FIG. 11, and is a signal having a voltage level corresponding to the electrostatic leakage component. As described above, since the electrostatic leakage detection signal QAO includes almost no physical quantity component and vibration leakage component, an adverse effect of the physical quantity component on the failure diagnosis based on the electrostatic leakage component is extremely little. When the wiring of the physical quantity detection element 100 is normal, the voltage of the electrostatic leakage detection signal QAO is a predetermined value. Therefore, when the magnitude of the electrostatic leakage detection signal QDOX generated based on the electrostatic leakage detection signal QAO does not fall in the predetermined first range, the failure diagnosis circuit 61 can make a diagnosis that the wiring of the physical quantity detection element 100 has a failure.

Further, since the signal at the point N in FIG. 10 is a signal having a voltage value of the reference voltage $V_{ref}$, the output signal of the smoothing circuit 36B, that is, the vibration leakage detection signal VAO includes almost no physical quantity component, but since the signal at the point N in FIG. 11 is a signal having the voltage value $V_3$, the vibration leakage detection signal VAO includes an electrostatic leakage component. Therefore, the vibration leakage detection signal VAO is a signal having a voltage level corresponding to the vibration leakage component with reference to the voltage value $V_3$. As described above, since the vibration leakage detection signal VAO includes almost no physical quantity component, an adverse effect of the physical quantity component on the failure diagnosis based on the vibration leakage component is extremely little. Further, although the vibration leakage detection signal VAO includes an electrostatic leakage component, a magnitude of the electrostatic leakage component is constant when the wiring of the physical quantity detection element 100 is normal, and thus an adverse effect of the electrostatic leakage component on the failure diagnosis based on the vibration leakage component is little. When the physical quantity detection element 100 is normal, the voltage of the vibration leakage detection signal VAO is a predetermined value. Therefore, when the magnitude of the vibration leakage detection signal VDOX generated based on the vibration leakage detection signal VAO does not fall in the second range, the failure diagnosis circuit 62 can make a diagnosis that the physical quantity detection element 100 has a failure.

As described above, in the physical quantity detection device 1 according to the second embodiment, when a failure such as disconnection or short circuit occurs in the wiring coupled to the physical quantity detection element 100, the magnitudes of the first electrostatic leakage component and the second electrostatic leakage component resulting from the second frequency component included in the drive signal propagating to the detection electrodes 114 and 115 respectively change, and thus the value of the electrostatic leakage detection signal QDOX generated based on the first electrostatic leakage component and the second electrostatic leakage component also changes in the physical quantity detection circuit 200. Therefore, according to the physical quantity detection device 1 of the first embodiment, since the physical quantity detection circuit 200 can generate the electrostatic leakage detection signal QDOX that can be used for failure diagnosis of the wiring coupled to the physical quantity detection element 100, for example, the MCU 5 that is an external device can diagnose a failure of the wiring based on the electrostatic leakage detection signal QDOX.

In the physical quantity detection device 1 according to the second embodiment, since the physical quantity detection circuit 200 can generate the electrostatic leakage detection signal QDOX that can be used for failure diagnosis of the wiring coupled to the physical quantity detection element 100 based on the electrostatic leakage component, the physical quantity detection element 100, which is tuned such that a vibration leakage component is zero or has a magnitude close to zero, can be used. Therefore, according to the physical quantity detection device 1 of the second embodiment, it is possible to lower the possibility that the detection accuracy of the physical quantity is degraded due to the vibration leakage component.

Further, in the physical quantity detection device 1 according to the second embodiment, when a failure such as breakage occurs in the physical quantity detection element 100, the magnitudes of the first vibration leakage component and the second vibration leakage component respectively generated in the detection electrodes 114 and 115 based on the vibration of the physical quantity detection element 100 change, and thus the value of the vibration leakage detection signal VDOX generated based on the first vibration leakage component and the second vibration leakage component also changes in the physical quantity detection circuit 200. Therefore, according to the physical quantity detection device 1 of the second embodiment, since the physical quantity detection circuit 200 can generate the vibration leakage detection signal VDOX that can be used for the failure diagnosis of the physical quantity detection element 100, for example, the MCU 5 that is an external device can diagnose a failure of the physical quantity detection element 100 based on the vibration leakage detection signal VDOX.

According to the physical quantity detection device 1 of the second embodiment, the physical quantity detection circuit 200 includes the failure diagnosis circuit 62 that performs failure diagnosis based on the vibration leakage detection signal VDOX. Accordingly, when a failure such as breakage occurs in the physical quantity detection element 100, since the electrostatic leakage detection signal QDOX changes, the failure of the physical quantity detection element 100 can be diagnosed.

In the physical quantity detection device 1 according to the second embodiment, since the physical quantity component included in the first signal output from the detection electrode 114 and the physical quantity component included in the second signal output from the detection electrode 115 are in opposite phases to each other, the physical quantity component is amplified by the differential amplifier circuit 32 and attenuated by the adder circuit 33 in the physical quantity detection circuit 200. Therefore, according to the physical quantity detection device 1 of the second embodiment, the physical quantity detection circuit 200 can generate the physical quantity detection signal SDOX with high accuracy, and the possibility that the accuracy of the electrostatic leakage detection signal QDOX is degraded due to the physical quantity component is lowered.

In the physical quantity detection device 1 according to the second embodiment, since the first electrostatic leakage component included in the first signal and the second electrostatic leakage component included in the second signal are in the same phase as each other, in the physical quantity detection circuit 200, the electrostatic leakage component is amplified by the adder circuit 33 and attenuated by the differential amplifier circuit 32. Therefore, according to the physical quantity detection device 1 of the second embodiment, the physical quantity detection circuit 200 can generate the electrostatic leakage detection signal QDOX with high accuracy, and the possibility that the accuracy of the physical quantity detection signal SDOX is degraded due to the electrostatic leakage component is lowered.

In the physical quantity detection device 1 according to the second embodiment, since the first vibration leakage component included in the first signal and the second vibration leakage component included in the second signal are in the same phase as each other, in the physical quantity detection circuit 200, the vibration leakage component is amplified by the adder circuit 33 and attenuated by the differential amplifier circuit 32. Therefore, according to the physical quantity detection device 1 of the second embodiment, the physical quantity detection circuit 200 can generate the vibration leakage detection signal VDOX with high accuracy, and the possibility that the accuracy of the physical quantity detection signal SDOX is degraded due to the vibration leakage component is lowered.

3. Modification

The present disclosure is not limited to the embodiments, and various modifications can be made within the scope of the gist of the present disclosure.

For example, although the physical quantity detection device 1 simultaneously performs processing of detecting a physical quantity and processing of generating a failure diagnosis signal in the above embodiments, the physical quantity detection device 1 may perform the processing of detecting a physical quantity and the processing of generating a failure diagnosis signal exclusively. For example, the physical quantity detection device 1 may perform the processing of detecting a physical quantity but not perform the processing of generating a failure diagnosis signal in a normal operation mode, and may perform the processing of generating a failure diagnosis signal but not perform the processing of detecting a physical quantity in a failure diagnosis mode.

Further, in the above embodiments, the physical quantity detection device 1 generates the failure diagnosis signal by detecting the electrostatic leakage component resulting from the second frequency component, which has the frequency twice the frequency of the first frequency component included in the drive signal, propagating to the detection electrodes 114 and 115. Alternatively, the physical quantity detection device 1 may generate the failure diagnosis signal by detecting an electrostatic leakage component resulting from a frequency component, which has a frequency of an even multiple other than two times or an odd multiple of the frequency of the first frequency component included in the drive signal, propagating to the detection electrodes 114 and 115.

In the above embodiments, the physical quantity detection circuit 200 outputs the physical quantity detection signal SDOX and the electrostatic leakage detection signal QDOX that are digital signals via the interface circuit 70. Alternatively, the physical quantity detection circuit 200 may output the physical quantity detection circuit SAO and the electrostatic leakage detection signal QAO that are analog signals via an external terminal. Similarly, in the second embodiment, the physical quantity detection circuit 200 outputs the vibration leakage detection signal VDOX that is a digital signal via the interface circuit 70. Alternatively, the physical quantity detection circuit 200 may output the vibration leakage detection signal VAO that is an analog signal via an external terminal.

In the first embodiment, the analog-digital conversion circuit 41 converts the physical quantity detection signal SAO into the physical quantity detection signal SDO, and the analog-digital conversion circuit 42 converts the electrostatic leakage detection signal QAO into the electrostatic leakage detection signal QDO. Alternatively, one analog-digital conversion circuit may perform, in a time division manner, the processing of converting the physical quantity detection signal SAO into the physical quantity detection signal SDO and the processing of converting the electrostatic leakage detection signal QAO into the electrostatic leakage detection signal QDO. In the second embodiment, the analog-digital conversion circuit 41 converts the physical quantity detection signal SAO into the physical quantity detection signal SDO, and the analog-digital conversion circuit 42 performs, in a time division manner, the processing of converting the electrostatic leakage detection signal QAO into the electrostatic leakage detection signal QDO and the processing of converting the vibration leakage detection signal VAO into the vibration leakage detection signal VDO. Alternatively, one analog-digital conversion circuit may perform, in a time division manner, the processing of converting the physical quantity detection signal SAO into the physical quantity detection signal SDO, the processing of converting the electrostatic leakage detection signal QAO into the electrostatic leakage detection signal QDO, and the processing of converting the vibration leakage detection signal VAO into the vibration leakage detection signal VDO. Further, alternatively, the analog-digital conversion circuit 42 may convert the electrostatic leakage detection signal QAO into the electrostatic leakage detection signal QDO, and an analog-digital conversion circuit different from the analog-digital conversion circuits 41 and 42 may convert the vibration leakage detection signal VAO into the vibration leakage detection signal VDO.

In the first embodiment, the digital signal processing circuit 51 generates the physical quantity detection signal SDOX by performing the predetermined arithmetic processing on the physical quantity detection signal SDO, and the digital signal processing circuit 52 generates the electrostatic leakage detection signal QDOX by performing the predetermined arithmetic processing on the electrostatic leakage detection signal QDO. Alternatively, one digital signal processing circuit may perform, in a time division manner, the processing of generating the physical quantity detection signal SDOX and the processing of generating the electrostatic leakage detection signal QDOX. In the second embodiment, the digital signal processing circuit 51 generates the physical quantity detection signal SDOX by performing the predetermined arithmetic processing on the physical quantity detection signal SDO, and the digital signal processing circuit 52 performs, in a time division manner, the processing of generating the electrostatic leakage detection signal QDOX by performing the predetermined arithmetic processing on the electrostatic leakage detection signal QDO and the processing of generating the vibration leakage detection signal VDOX by performing the predetermined arithmetic processing on the vibration leakage detection signal VDO. Alternatively, one digital signal processing circuit may perform, in a time division manner, the processing of generating the physical quantity detection signal SDOX, the processing of generating the electrostatic leakage detection signal QDOX, and the processing of generating the vibration leakage detection signal VDOX. Further, alternatively, the digital signal processing circuit 52 may generate the electrostatic leakage detection signal QDOX, and a digital signal processing circuit different from the digital signal processing circuits 51 and 52 may generate the vibration leakage detection signal VDOX.

In the above embodiments, the physical quantity detection device 1 includes the physical quantity detection element 100 that detects an angular velocity as a physical quantity. Alternatively, the physical quantity detection device 1 may include a physical quantity detection element that detects a physical quantity other than the angular velocity. For example, the physical quantity detection device 1 may include a physical quantity detection element that detects a physical quantity such as an acceleration, an angular acceleration, a velocity, and a force.

In the above embodiments, the physical quantity detection device 1 includes one physical quantity detection element. Alternatively, the physical quantity detection device 1 may include a plurality of physical quantity detection elements. For example, the physical quantity detection device 1 may include a plurality of physical quantity detection elements, and each of the plurality of physical quantity detection elements may detect a physical quantity using one of two or more axes orthogonal to each other as a detection axis. In addition, for example, the physical quantity detection device 1 may include a plurality of physical quantity detection elements, and each of the plurality of physical quantity detection elements may detect one of a plurality of types of physical quantities such as an angular velocity, an acceleration, an angular acceleration, a velocity, and a force. That is, the physical quantity detection device 1 may be a composite sensor.

In the above embodiments, an example in which the vibrator element of the physical quantity detection element 100 is a double T-type quartz crystal vibrator element has been described. Alternatively, the vibrator element of the physical quantity detection element that detects various physical quantities may be, for example, a vibrator element of a tuning fork type or a comb tooth type, or may be a vibrator element of a tuning fork type having a shape such as a triangular prism, a quadrangular prism, or a columnar shape. As a material of the vibrator element of the physical quantity detection element, for example, a piezoelectric material such as a piezoelectric single crystal like lithium tantalate ($LiTaO_3$) and lithium niobate ($LiNbO_3$) or a piezoelectric ceramic such as lead zirconate titanate (PZT) may be used instead of quartz crystal ($SiO_2$), or a silicon semiconductor may be used. The vibrator element of the physical quantity detection element may have, for example, a structure in which a piezoelectric thin film of zinc oxide (ZnO), aluminum nitride (AlN), or the like sandwiched between drive electrodes is disposed on a part of a surface of a silicon semiconductor. For example, the physical quantity detection element may be an MEMS element. The MEMS is an abbreviation for micro electro mechanical system.

Although an piezoelectric-type physical quantity detection element is exemplified in the above embodiments, the physical quantity detection element that detects various physical quantities is not limited to the piezoelectric-type element, and may be an element of a capacitance type, an electrodynamic type, an eddy current type, an optical type, a strain gauge type, or the like. The physical quantity detection element is not limited to the vibration-type detection element and may be, for example, an optical-type detection element, a rotary-type detection element, or a fluid-type detection element.

The embodiments and modifications described above are merely examples, and the present disclosure is not limited thereto. For example, the embodiments and the modifications can be combined as appropriate.

The present disclosure includes a configuration substantially the same as a configuration described in the embodiments, for example, a configuration having the same function, method, and result, or a configuration having the same object and effect. The present disclosure includes a configuration obtained by replacing a non-essential part of a configuration described in the embodiments. The present disclosure includes a configuration having the same operation and effect as a configuration described in the embodiments, or a configuration capable of achieving the same object. Further, the present disclosure includes a configuration obtained by adding a known technique to a configuration described in the embodiments.

The following contents are derived from the above embodiments and modifications.

A physical quantity detection circuit according to an aspect includes:

a drive circuit configured to apply a drive signal including a first frequency component for driving a physical quantity detection element to a drive electrode of the physical quantity detection element, the physical quantity detection element being configured to detect a physical quantity;

a physical quantity detection signal output circuit configured to output a physical quantity detection signal corresponding to the physical quantity, based on a first physical quantity component included in a first signal output from a first detection electrode of the physical quantity detection element when the drive signal is applied to the physical quantity detection element and a second physical quantity component included in a second signal output from a second detection electrode of the physical quantity detection element when the drive signal is applied to the physical quantity detection element; and a first failure diagnosis signal output circuit, in which the drive signal includes a second frequency component having a frequency different from a frequency of the first frequency component, the first signal includes a first electrostatic leakage component that is a component resulting from the second frequency component propagating to the first detection electrode via a first electrostatic coupling capacitor between the drive electrode and the first detection electrode, the second signal includes a second electrostatic leakage component that is a component resulting from the second frequency component propagating to the second detection electrode via a second electrostatic coupling capacitor between the drive electrode and the second detection electrode, and the first failure diagnosis signal output circuit outputs a first failure diagnosis signal generated based on the first electrostatic leakage component and the second electrostatic leakage component.

In the physical quantity detection circuit, when a failure such as disconnection or short circuit occurs in a wiring coupled to the physical quantity detection element, magnitudes of the first electrostatic leakage component and the second electrostatic leakage component resulting from the second frequency component included in the drive signal propagating to the first detection electrode and the second detection electrode respectively change, and thus the first failure diagnosis signal generated based on the first electrostatic leakage component and the second electrostatic leakage component also changes. Therefore, according to the physical quantity detection circuit, it is possible to generate the first failure diagnosis signal that can be used for failure diagnosis of the wiring coupled to the physical quantity detection element, and thus, for example, an external device can diagnose a failure of the wiring based on the first failure diagnosis signal.

In the physical quantity detection circuit, since the first failure diagnosis signal that can be used for failure diagnosis of the wiring coupled to the physical quantity detection element can be generated based on the electrostatic leakage component, it is possible to couple to the physical quantity detection element that is tuned such that a vibration leakage component is zero or has a magnitude close to zero. Therefore, according to the physical quantity detection circuit, it is possible to lower the possibility that the detection accuracy of the physical quantity is degraded due to the vibration leakage component.

In the physical quantity detection circuit according to the aspect,
the frequency of the second frequency component may be two times the frequency of the first frequency component.

In the physical quantity detection circuit according to the aspect,
the drive circuit may include a full-wave rectification circuit, and
the second frequency component may be generated by the full-wave rectification circuit.

According to this physical quantity detection circuit, the full-wave rectification circuit necessary for generating the drive signal can also be used as a circuit for generating the second frequency component necessary for the failure diagnosis based on the electrostatic leakage component, and thus a dedicated circuit for generating the second frequency component is not necessary.

The physical quantity detection circuit according to the aspect may further include:
a first failure diagnosis circuit configured to perform failure diagnosis based on the first failure diagnosis signal.

According to the physical quantity detection circuit, when a failure such as disconnection or short circuit occurs in the wiring coupled to the physical quantity detection element, since the first failure diagnosis signal changes, it is possible to diagnose a failure of the wiring.

In the physical quantity detection circuit according to the aspect,
the physical quantity detection signal output circuit may include
a differential amplifier circuit configured to differentially amplify a signal pair that is based on the first signal and the second signal,
a first synchronous detection circuit configured to synchronously detect a signal that is based on an output signal of the differential amplifier circuit and output a signal corresponding to a difference between the first physical quantity component and the second physical quantity component, and
a physical quantity detection signal generation circuit configured to generate the physical quantity detection signal based on the output signal of the first synchronous detection circuit, and
the first failure diagnosis signal output circuit may include
an adder circuit configured to add up the signal pair,
a second synchronous detection circuit configured to synchronously detect a signal that is based on an output signal of the adder circuit and output a signal corresponding to a sum of the first electrostatic leakage component and the second electrostatic leakage component, and
a first failure diagnosis signal generation circuit configured to generate the first failure diagnosis signal based on the output signal of the second synchronous detection circuit.

In the physical quantity detection circuit, since the physical quantity component included in the first signal and the physical quantity component included in the second signal are in opposite phases to each other, the physical quantity component is amplified by the differential amplifier circuit and attenuated by the adder circuit. Therefore, according to the physical quantity detection circuit, it is possible to generate the physical quantity detection signal with high accuracy, and it is possible to lower the possibility that the accuracy of the first failure diagnosis signal is degraded due to the physical quantity component.

In the physical quantity detection circuit, since the first electrostatic leakage component included in the first signal and the second electrostatic leakage component included in the second signal are in the same phase as each other, the electrostatic leakage component is amplified by the adder circuit and attenuated by the differential amplifier circuit. Therefore, according to the physical quantity detection circuit, the first failure diagnosis signal can be generated with high accuracy, and the possibility that the accuracy of the physical quantity detection signal is degraded due to the electrostatic leakage component is lowered.

The physical quantity detection circuit according to the aspect may further include:
a second failure diagnosis signal output circuit, in which
the first signal may include a first vibration leakage component that is based on vibration of the physical
the second signal may include a second vibration leakage component that is based on the vibration of the physical quantity detection element, and
the second failure diagnosis signal output circuit may output a second failure diagnosis signal generated based on the first vibration leakage component and the second vibration leakage component.

In the physical quantity detection circuit, when a failure such as breakage occurs in the physical quantity detection element, magnitudes of the first vibration leakage component and the second vibration leakage component generated in the first detection electrode and the second detection electrode, respectively, based on the vibration of the physical quantity detection element change, and thus the second failure diagnosis signal generated based on the first vibration leakage component and the second vibration leakage component also changes. Therefore, according to the physical quantity detection circuit, since the second failure diagnosis signal that can be used for failure diagnosis of the physical quantity detection element can be generated, for example, an external device can diagnose a failure of the physical quantity detection element based on the second failure diagnosis signal.

In the physical quantity detection circuit according to the aspect,
the physical quantity detection signal output circuit may include
a differential amplifier circuit configured to differentially amplify a signal pair that is based on the first signal and the second signal,
a first synchronous detection circuit configured to synchronously detect a signal that is based on an output signal of the differential amplifier circuit and output a signal corresponding to a difference between the first physical quantity component and the second physical quantity component, and
a physical quantity detection signal generation circuit configured to generate the physical quantity detection signal based on the output signal of the first synchronous detection circuit,
the first failure diagnosis signal output circuit may include
an adder circuit configured to add up the signal pair,
a second synchronous detection circuit configured to synchronously detect a signal that is based on an output signal of the adder circuit and output a signal corresponding to a sum of the first electrostatic leakage component and the second electrostatic leakage component, and a first failure diagnosis signal generation circuit configured to generate the first failure diagnosis signal based on the output signal of the second synchronous detection circuit, and the second failure diagnosis signal output circuit may include a third synchronous detection circuit configured to synchronously detect a signal that is based on an output signal of the adder circuit and output a signal corresponding to a sum of the first vibration leakage component and the second vibration leakage component, and a second failure diagnosis signal generation circuit configured to generate the second failure diagnosis signal based on the output signal of the second synchronous detection circuit.

In the physical quantity detection circuit, since the physical quantity component included in the first signal and the physical quantity component included in the second signal are in opposite phases to each other, the physical quantity component is amplified by the differential amplifier circuit and attenuated by the adder circuit. Therefore, according to the physical quantity detection circuit, it is possible to generate the physical quantity detection signal with high accuracy, and it is possible to lower the possibility that the accuracy of the first failure diagnosis signal and the second failure diagnosis signal is degraded due to the physical quantity component.

In the physical quantity detection circuit, since the first electrostatic leakage component included in the first signal and the second electrostatic leakage component included in the second signal are in the same phase as each other, the electrostatic leakage component is amplified by the adder circuit and attenuated by the differential amplifier circuit. Therefore, according to the physical quantity detection circuit, the first failure diagnosis signal can be generated with high accuracy, and the possibility that the accuracy of the physical quantity detection signal is degraded due to the electrostatic leakage component is lowered.

In the physical quantity detection circuit, the first vibration leakage component included in the first signal and the second vibration leakage component included in the second signal are in the same phase as each other, and thus the vibration leakage component is amplified by the adder circuit and attenuated by the differential amplifier circuit. Therefore, according to the physical quantity detection circuit, the second failure diagnosis signal can be generated with high accuracy, and the possibility that the accuracy of the physical quantity detection signal is degraded due to the vibration leakage component is lowered.

The physical quantity detection circuit according to the aspect may further include:

a second failure diagnosis circuit configured to perform failure diagnosis based on the second failure diagnosis signal.

According to the physical quantity detection circuit, when a failure such as breakage occurs in the physical quantity detection element, since the second failure diagnosis signal changes, it is possible to diagnose a failure of the physical quantity detection element.

A physical quantity detection device according to an aspect includes:

the physical quantity detection circuit according to the aspect; and the physical quantity detection element.

In the physical quantity detection device, when a failure such as disconnection or short circuit occurs in a wiring coupled to the physical quantity detection element, magnitudes of the first electrostatic leakage component and the second electrostatic leakage component resulting from the second frequency component included in the drive signal propagating to the first detection electrode and the second detection electrode respectively change, and thus the first failure diagnosis signal generated based on the first electrostatic leakage component and the second electrostatic leakage component also changes. Therefore, according to the physical quantity detection device, it is possible to generate the first failure diagnosis signal that can be used for failure diagnosis of the wiring coupled to the physical quantity detection element, and thus, for example, an external device can diagnose a failure of the wiring based on the first failure diagnosis signal.

In the physical quantity detection device, since the first failure diagnosis signal that can be used for failure diagnosis of the wiring coupled to the physical quantity detection element can be generated based on the electrostatic leakage component, it is possible to use the physical quantity detection element that is tuned such that a vibration leakage component is zero or has a magnitude close to zero. Therefore, according to the physical quantity detection device, it is possible to lower the possibility that the detection accuracy of the physical quantity is degraded due to the vibration leakage component.

What is claimed is:

1. A physical quantity detection circuit, comprising:

a drive circuit configured to apply a drive signal including a first frequency component for driving a physical quantity detection element to a drive electrode of the physical quantity detection element, the physical quantity detection element being configured to detect a physical quantity;

a physical quantity detection signal output circuit configured to output a physical quantity detection signal corresponding to the physical quantity, based on a first physical quantity component included in a first signal output from a first detection electrode of the physical quantity detection element when the drive signal is applied to the physical quantity detection element and a second physical quantity component included in a second signal output from a second detection electrode of the physical quantity detection element when the drive signal is applied to the physical quantity detection element; and a first failure diagnosis signal output circuit, wherein the drive signal includes a second frequency component having a frequency different from a frequency of the first frequency component, the first signal includes a first electrostatic leakage component that is a component resulting from the second frequency component propagating to the first detection electrode via a first electrostatic coupling capacitor between the drive electrode and the first detection electrode, the second signal includes a second electrostatic leakage component that is a component resulting from the second frequency component propagating to the second detection electrode via a second electrostatic coupling capacitor between the drive electrode and the second detection electrode, and the first failure diagnosis signal output circuit is configured to output a first failure diagnosis signal generated based on the first electrostatic leakage component and the second electrostatic leakage component.

2. The physical quantity detection circuit according to claim 1,
wherein the frequency of the second frequency component is two times the frequency of the first frequency component.

3. The physical quantity detection circuit according to claim 1,
wherein the drive circuit includes a full-wave rectification circuit, and
the second frequency component is generated by the full-wave rectification circuit.

4. The physical quantity detection circuit according to claim 1, further comprising:
a failure diagnosis circuit configured to perform failure diagnosis based on the first failure diagnosis signal.

5. The physical quantity detection circuit according to claim 1,
wherein the physical quantity detection signal output circuit includes;
a differential amplifier circuit configured to differentially amplify a signal pair that is generated based on the first signal and the second signal;
a first synchronous detection circuit configured to synchronously detect a signal that is generated based on an output signal of the differential amplifier circuit and output a signal that has a value corresponding to a difference between the first physical quantity component and the second physical quantity component; and
a physical quantity detection signal generation circuit configured to receive the output signal of the first synchronous detection circuit to generate the physical quantity detection signal, and
the first failure diagnosis signal output circuit includes:
an adder circuit configured to add up the signal pair;
a second synchronous detection circuit configured to synchronously detect a signal that is generated based on an output signal of the adder circuit and output a signal that has a value corresponding to a sum of the first electrostatic leakage component and the second electrostatic leakage component; and
a first failure diagnosis signal generation circuit configured to receive the output signal of the second synchronous detection circuit to generate the first failure diagnosis signal.

6. The physical quantity detection circuit according to claim 1, further comprising:
a second failure diagnosis signal output circuit,
wherein the first signal includes a first vibration leakage component that is based on vibration of the physical quantity detection element,
the second signal includes a second vibration leakage component that is based on the vibration of the physical quantity detection element, and
the second failure diagnosis signal output circuit is configured to output a second failure diagnosis signal generated based on the first vibration leakage component and the second vibration leakage component.

7. The physical quantity detection circuit according to claim 6,
wherein the physical quantity detection signal output circuit includes;
a differential amplifier circuit configured to differentially amplify a signal pair that is generated based on the first signal and the second signal;
a first synchronous detection circuit configured to synchronously detect a signal that is generated based on an output signal of the differential amplifier circuit and output a signal that has a value corresponding to a difference between the first physical quantity component and the second physical quantity component; and
a physical quantity detection signal generation circuit configured to receive the output signal of the first synchronous detection circuit to generate the physical quantity detection signal,
the first failure diagnosis signal output circuit includes:
an adder circuit configured to add up the signal pair;
a second synchronous detection circuit configured to synchronously detect a signal that is generated based on an output signal of the adder circuit and output a signal that has a value corresponding to a sum of the first electrostatic leakage component and the second electrostatic leakage component; and
a first failure diagnosis signal generation circuit configured to receive the output signal of the second synchronous detection circuit to generate the first failure diagnosis signal, and
the second failure diagnosis signal output circuit includes:
a third synchronous detection circuit configured to synchronously detect a signal that is generated based on the output signal of the adder circuit and output a signal that has a value corresponding to a sum of the first vibration leakage component and the second vibration leakage component; and
a second failure diagnosis signal generation circuit configured to receive the output signal of the third synchronous detection circuit to generate the second failure diagnosis signal.

8. The physical quantity detection circuit according to claim 6, further comprising: a failure diagnosis circuit configured to perform failure diagnosis based on the second failure diagnosis signal.

9. A physical quantity detection device comprising:
the physical quantity detection circuit according to claim 1; and
the physical quantity detection element.

* * * * *